April 19, 1938. R. L. CARR 2,114,830
VEHICLE
Filed Jan. 15, 1935 14 Sheets-Sheet 5

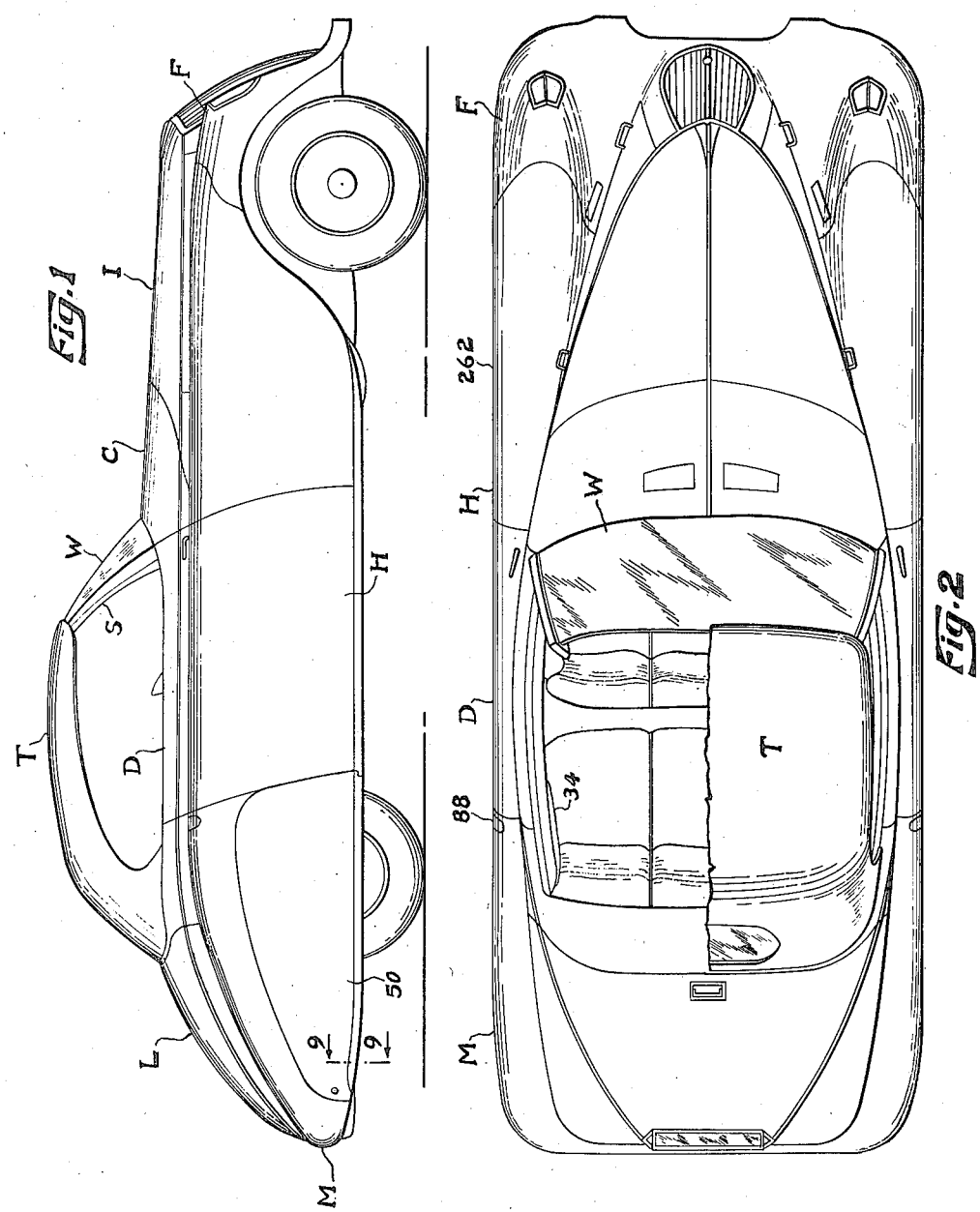

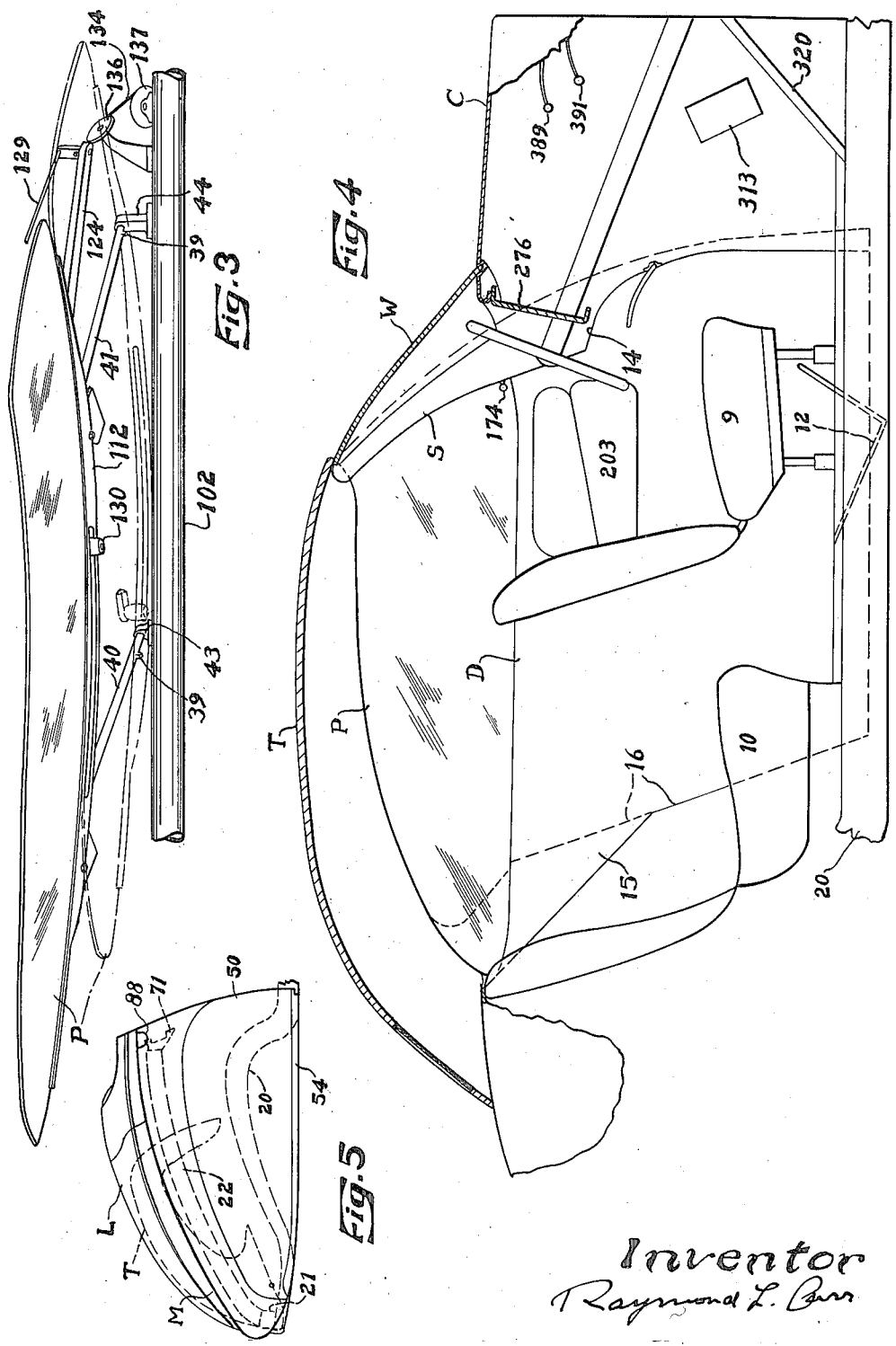

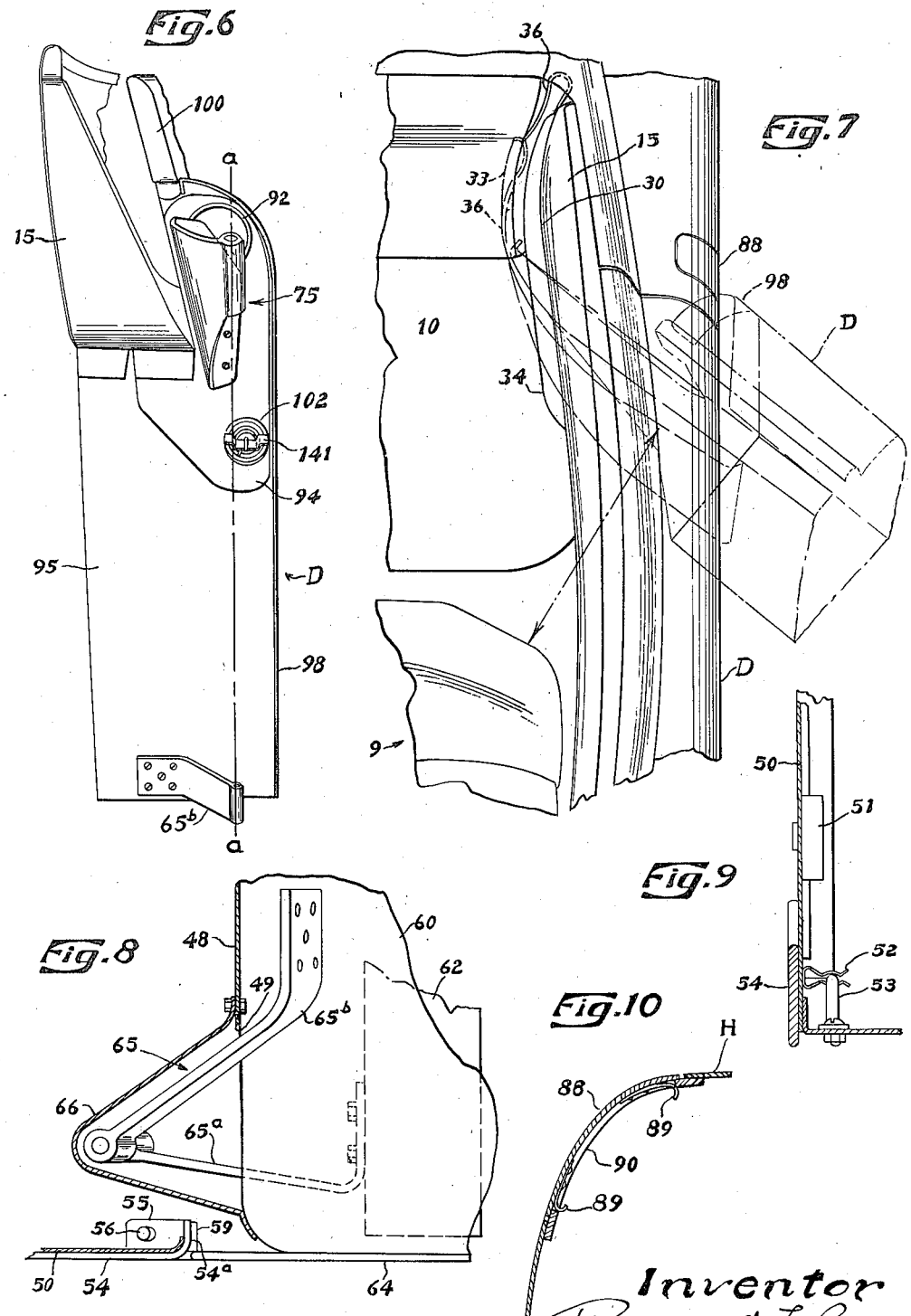

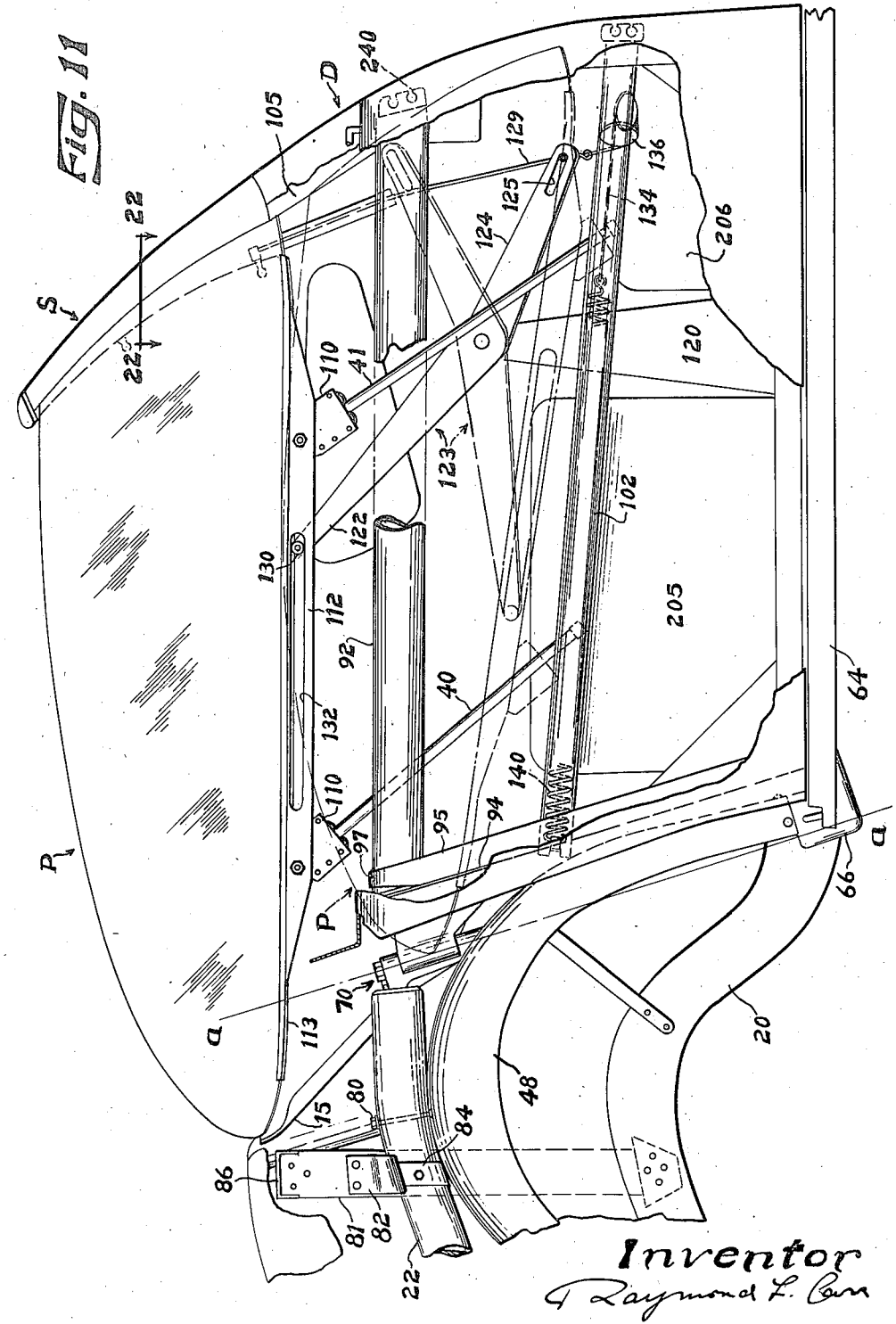

Inventor
Raymond L. Carr

April 19, 1938. R. L. CARR 2,114,830
VEHICLE
Filed Jan. 15, 1935 14 Sheets-Sheet 6
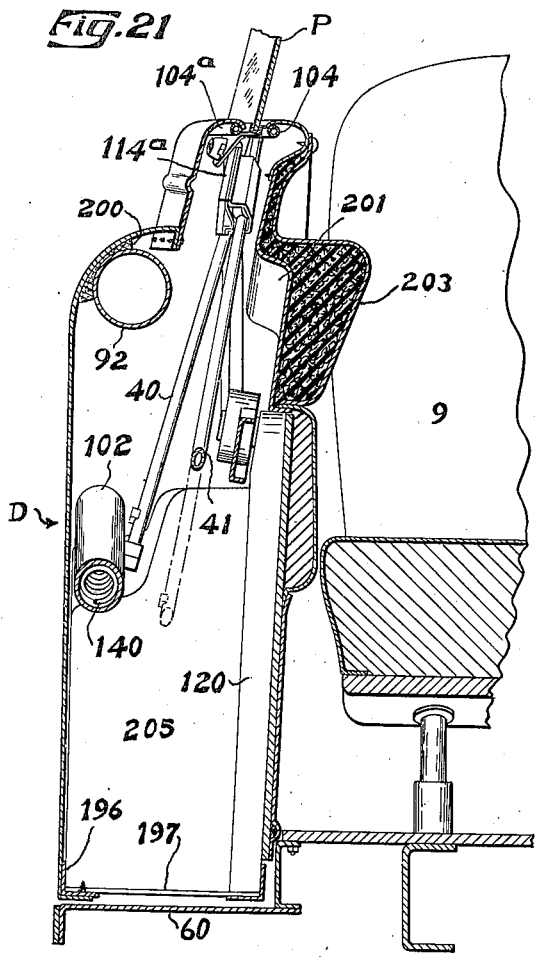
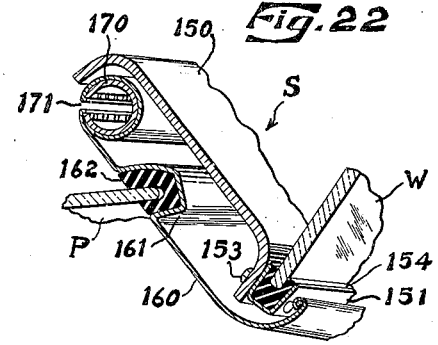
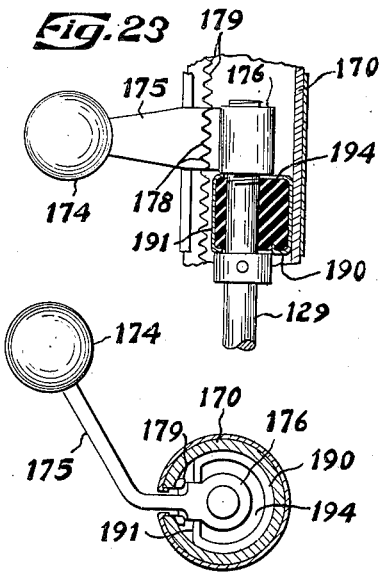
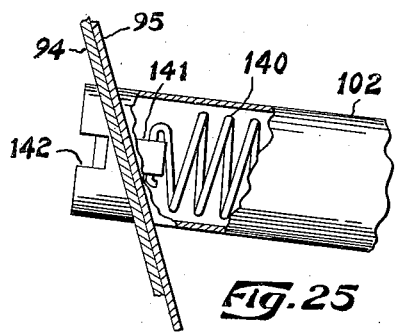
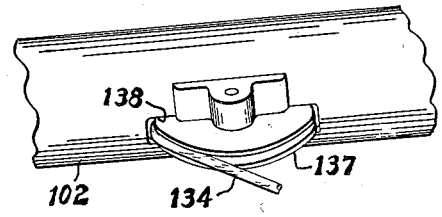
Inventor
Raymond L. Carr

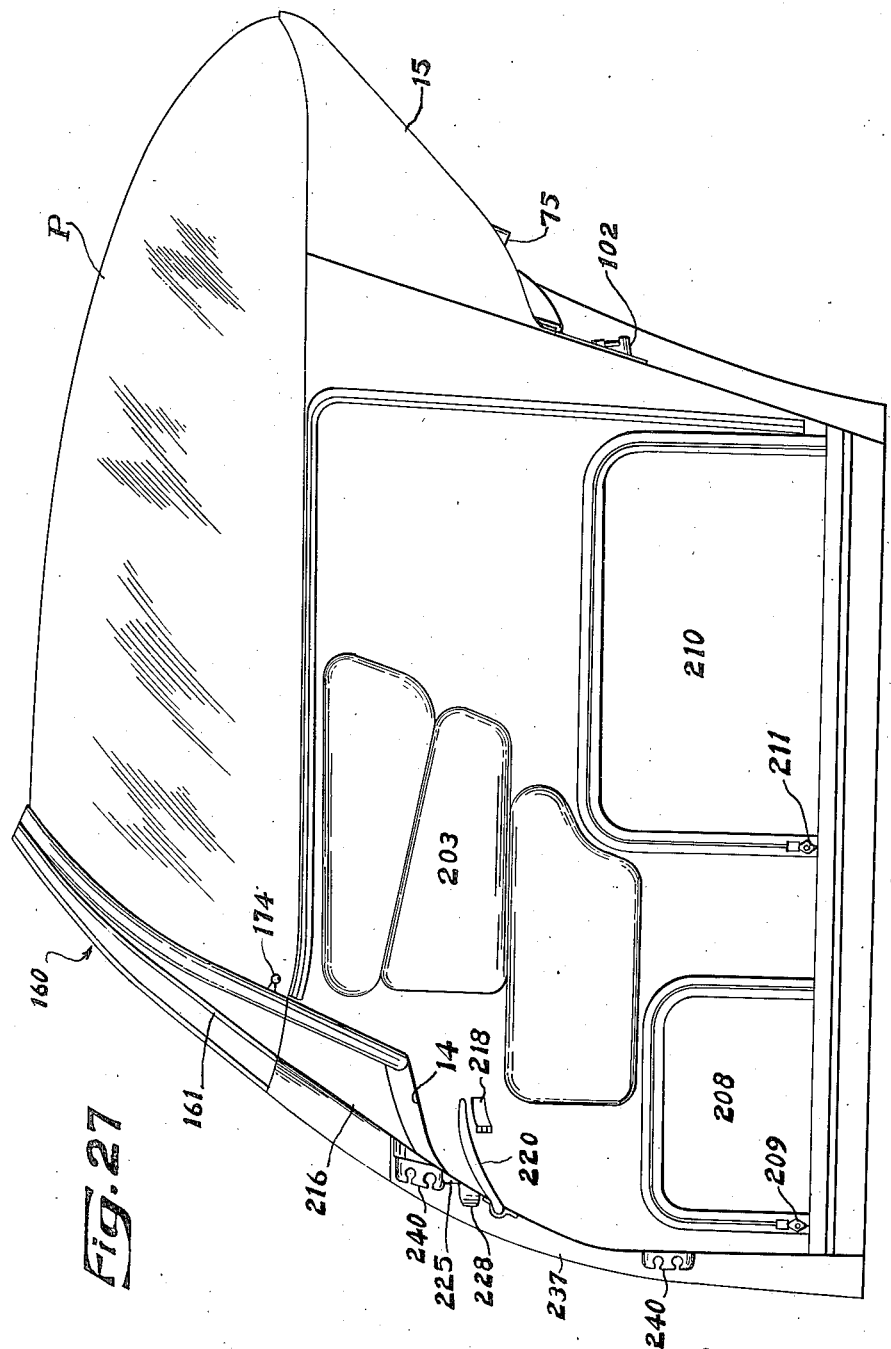

April 19, 1938.  R. L. CARR  2,114,830
VEHICLE
Filed Jan. 15, 1935    14 Sheets-Sheet 8
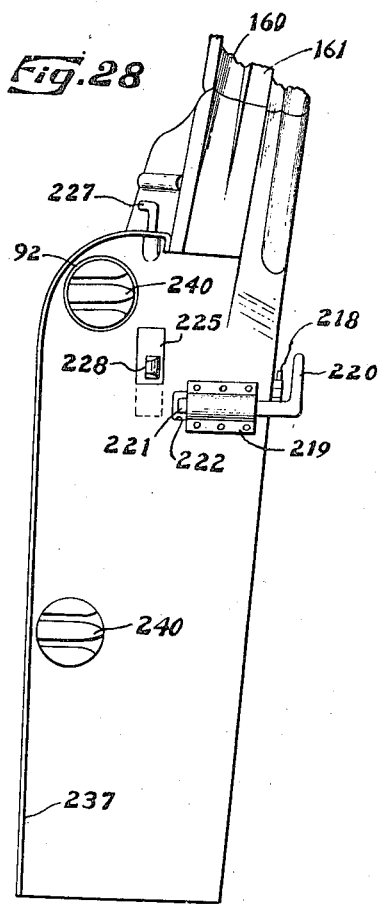
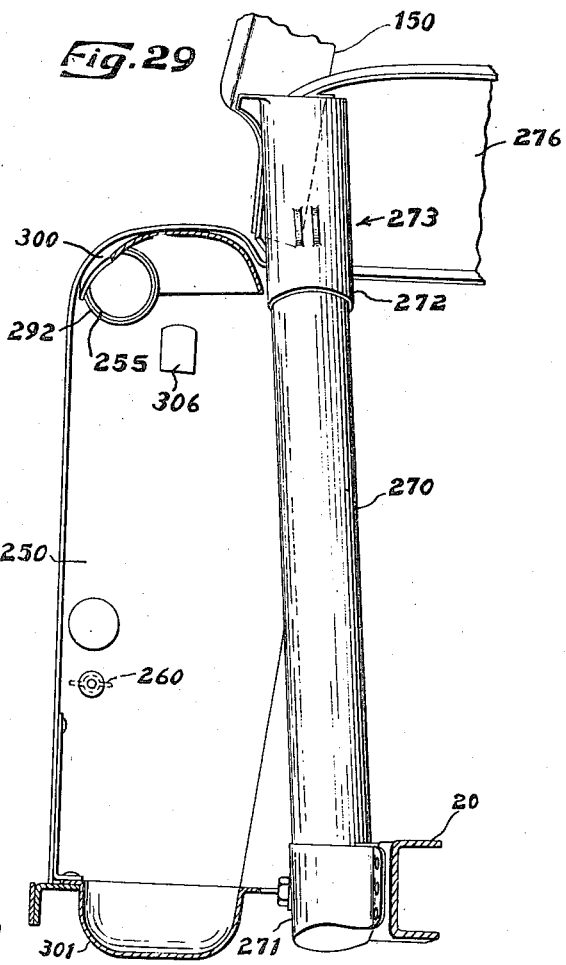
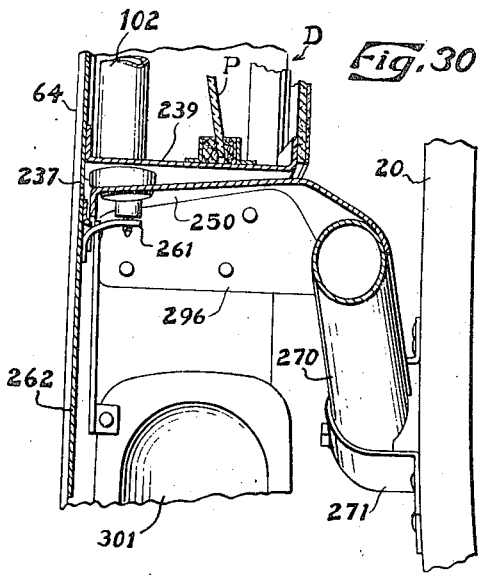
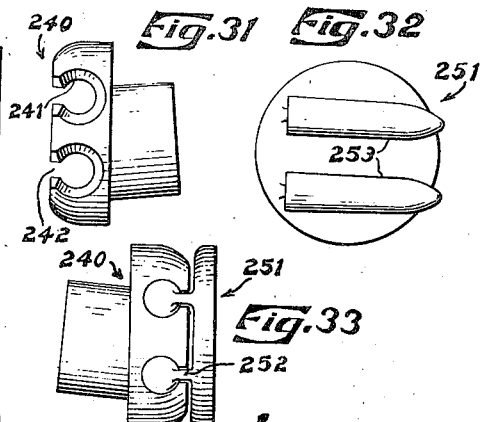
Inventor
Raymond L. Carr

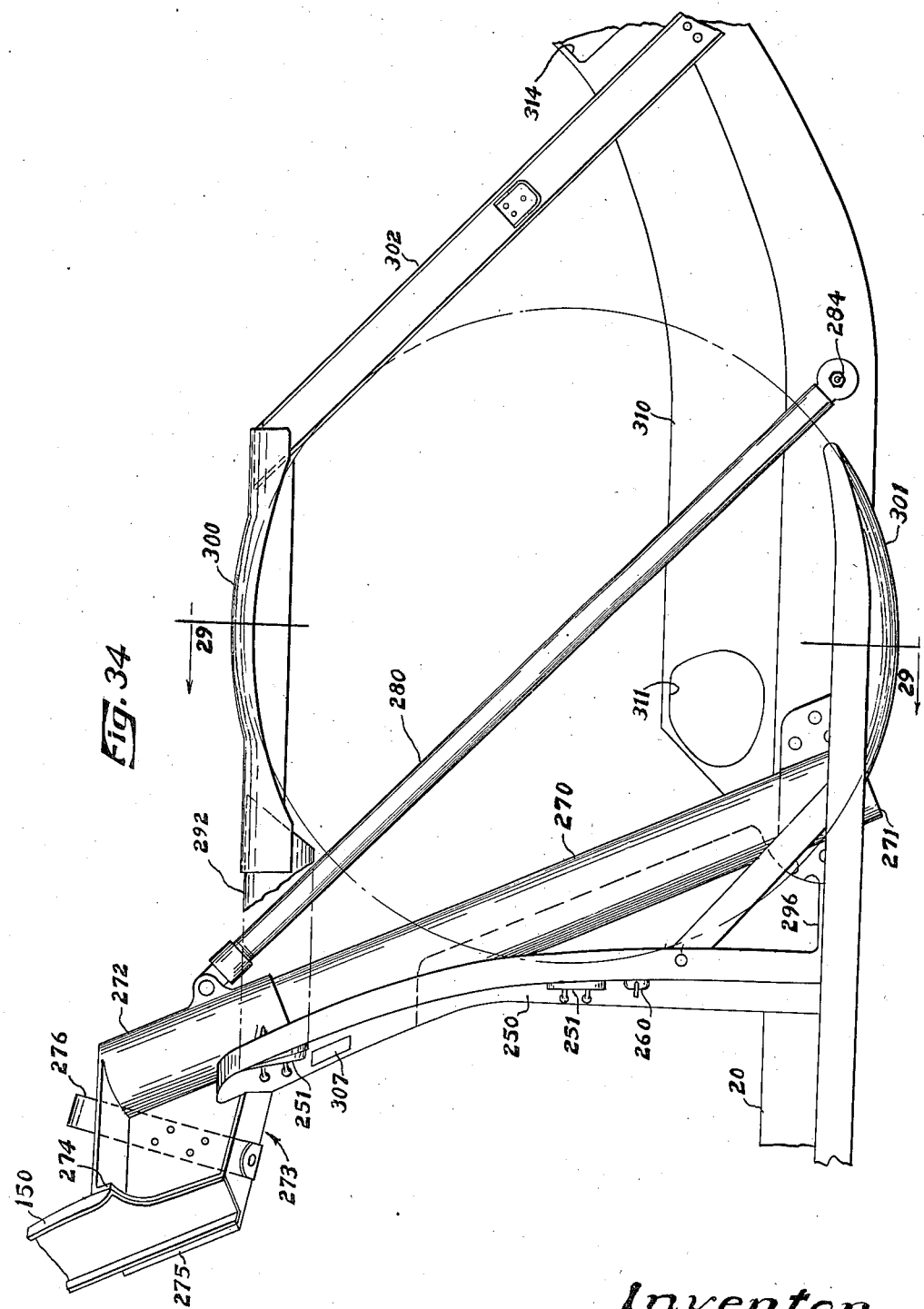

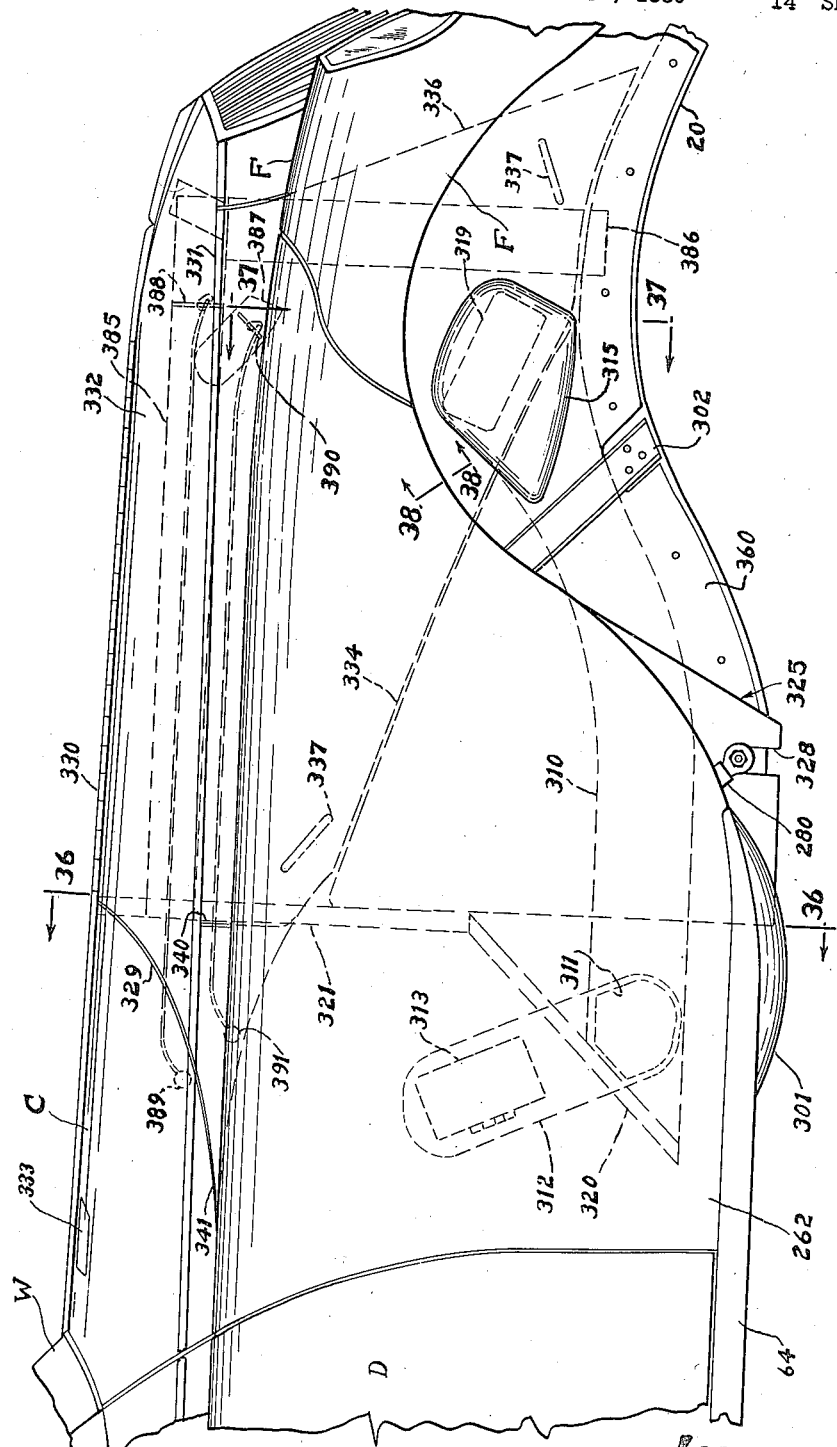

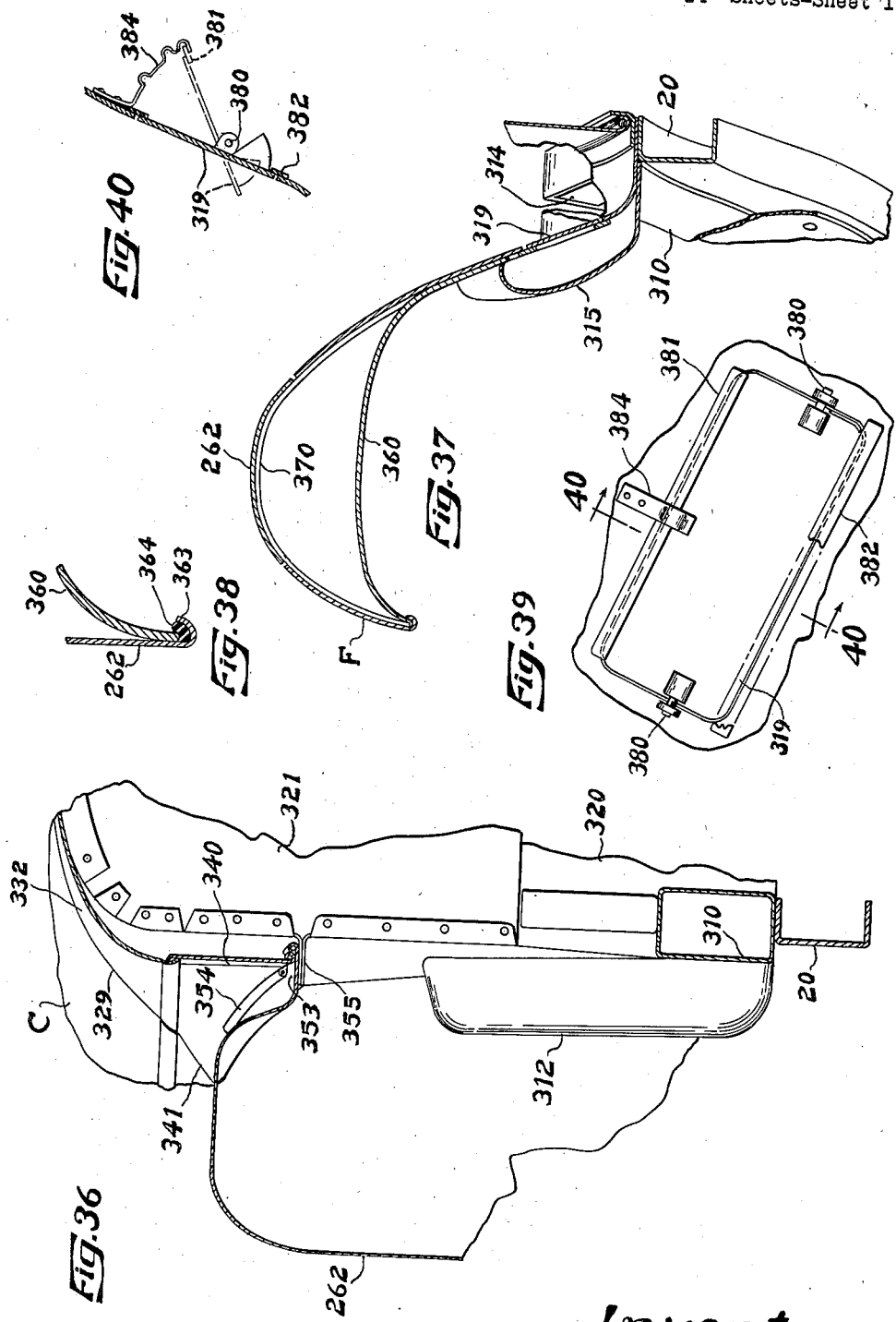

April 19, 1938.    R. L. CARR    2,114,830
VEHICLE
Filed Jan. 15, 1935    14 Sheets-Sheet 12

Inventor
Raymond L. Carr

April 19, 1938.  R. L. CARR  2,114,830
VEHICLE
Filed Jan. 15, 1935    14 Sheets-Sheet 13
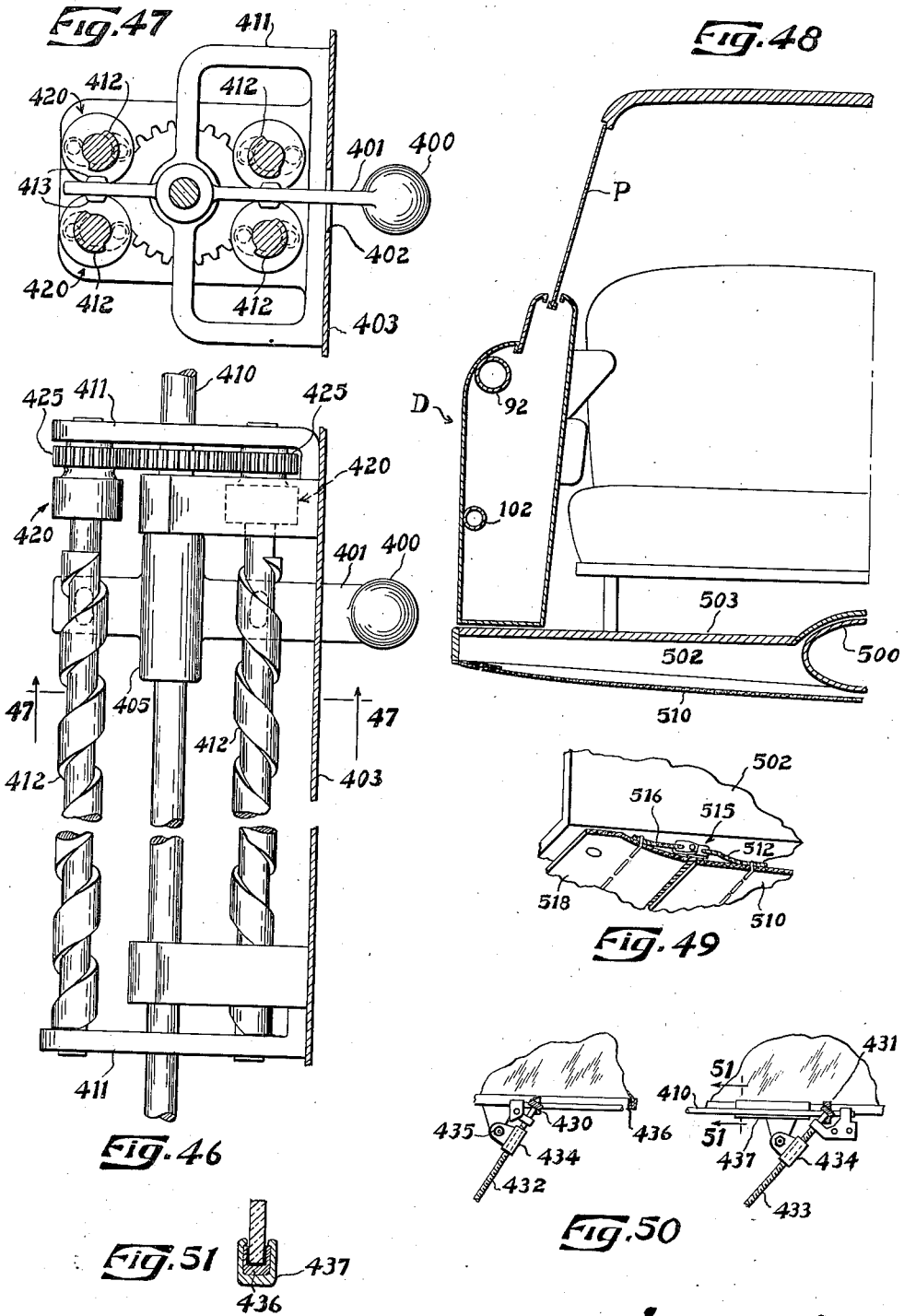

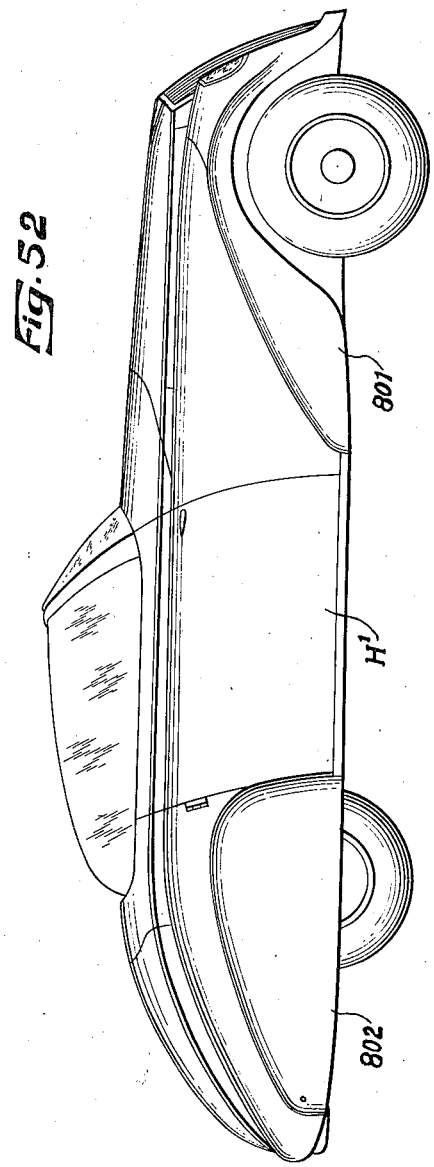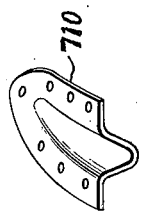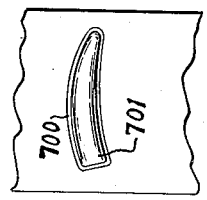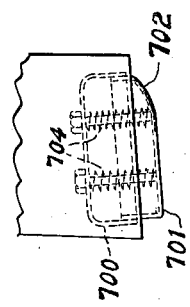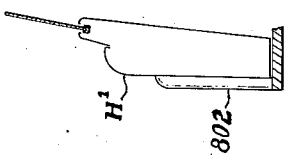

Patented Apr. 19, 1938

2,114,830

UNITED STATES PATENT OFFICE 2,114,830

VEHICLE

Raymond L. Carr, Boston, Mass.

Application January 15, 1935, Serial No. 1,967

38 Claims. (Cl. 296—28)

This invention relates to an improved vehicle construction, and more particularly to an improved body construction with contributory improvements in the arrangement of the component parts of the chassis. The present invention affords a vehicle of the streamline type having aerodynamic stability in the presence of side winds and retaining the advantages of earlier forms of bodies, including accessibility and attractive appearance. Thus in accordance with this invention the stubby appearance that has characterized certain recent streamlined vehicles is avoided, while ready access to the engine compartment is permitted. More specifically, the present invention affords an improved vehicle body of the convertible type which is streamlined both when the top and windows are raised and when both the top and windows are lowered, as well as when the top is lowered and the windows are raised.

To permit these desirable results, preferably a compact seating arrangement is employed, of the general character disclosed in my prior Patent No. 1,953,953, the rear seat being spaced ahead of the rear axle and preferably slightly lower than the front seat. The body preferably has a curved windshield of the general character disclosed in my copending application Serial No. 690,331, filed September 21, 1933. Such a windshield affords a low wind resistance in still air and facilitates the movement of side winds about the superstructure. Thus, for example, assuming that there is a wind at right angles to the direction of vehicle movement and that the speed of the wind is of substantially the same order as the speed of the vehicle, the net component of wind force will be directed at an angle of forty-five degrees to the path of the vehicle. Such a wind will pass about the end of a curved windshield with a minimum tendency to swing the vehicle from its path. Thus the aerodynamic stability of the vehicle is enhanced.

Furthermore, the curved windshield permits the arrangement of the front side posts substantially beside the front seat so that the top may be made relatively short to reduce the side area of the superstructure and enhance the aerodynamic stability of the vehicle. Obviously this positioning of the side posts as well as the arrangement of the upper edge of the windshield over the midportion or rear of the bottom of the front seat aids the visibility afforded to the occupants of the front seat. An arrangement of the character described permits a streamlining effect even when the top is lowered, since the upper part of the curved windshield is located so that it directs the air stream over the compact passenger compartment and over the heads of the occupants of the rear seat. Thus, the main air stream has less tendency to strike the back of the rear seat or the occupants of the same.

The arrangement of the rear seat substantially forward of the rear axle permits a relatively large storage compartment to be provided at the rear of the vehicle. Such a compartment may be streamlined to decrease the wind resistance and is particularly desirable in a convertible body, since the lowered top may be received thereby, thus enhancing the streamlined condition of the vehicle when the top is lowered. Furthermore, such a storage compartment may have a moderate height so that the stability of the vehicle under side winds is not adversely affected as in the case of a relatively high and bulky tail portion.

A compact body arrangement of this character with the windshield posts disposed substantially beside the front seats facilitates the provision of a single door upon each side of the vehicle to afford ready access to both the front and rear compartments. Such a door may be arranged to provide adequate room for entering the vehicle without necessity for folding or moving the front seats. Furthermore, in accordance with this invention, such a door may be arranged to carry a single long window panel extending along substantially the entire side of the passenger compartment. Thus the eddy currents and air pockets which are caused by the conventional posts between windows or joints between window sections may be avoided and the air resistance of the body is reduced.

To facilitate the arrangement of such a long window panel, the door preferably is rabbeted and provided with a rear extension to support the back portion of the raised window, a suitable lifting and guiding arrangement being provided to direct the window downwardly and forwardly to clear the rear wheel housing or mud guard; while the front edge of the window may remain in contact with the channel extending downwardly in the post at the front of the door. Obviously the door extension is substantially concealed and permits the window panel to be longer than the main part of the door. Such a long panel facilitates movement of air past the passenger compartment when the top is lowered and the panel is raised. In fact, the panel may be shaped to provide an upper edge substantially conforming to the path of the air stream as it leaves the upper edge of the windshield, so that the region behind the windshield and between the raised panels may contain a body of substantially "still air" over the passenger compartment.

The arrangement of each windshield standard beside the front seat results in a limited door area in front of the back of the seat, thus making a conventional crank-operated lifter mechanism somewhat undesirable. Accordingly I have provided lifter mechanisms which may be operable by handles movable along rectilinear paths. Such a path may substantially parallel one margin of the front portion of the window opening. Thus, for example, the lifter handle may follow a path defined by an upwardly extending slot in the rear portion of the door post or a path defined by a slot in the upper margin of the inner face of the door.

A salient feature of the present invention is the provision of a longitudinally disposed housing extending along each side of the vehicle and effective partially or wholly to cover and conceal the running board or step at the side of the vehicle. Such a housing may have a headlight disposed in its forward portion and may extend backwardly beside the hood, having a portion which is part of the door or doors at each side of the vehicle and having a rear streamlined portion disposed over and behind the rear mud guard. Such a housing may be effective in partially or totally eliminating the air pocket which normally has existed between the front and rear mud guards and which obviously materially increases the wind resistance of the vehicle. The arrangement of the headlights streamlined into the front portions of the housing also materially reduces wind resistance.

Furthermore, a housing of this character may serve to impart a relatively long, racy appearance to the vehicle body in contrast to the stubby appearance that is afforded by many proposed streamline constructions. Such a housing may be arranged so that the sides of the hood are spaced inwardly therefrom, thus affording "valleys" between the hood and the parts of the housing which cover the front wheels. Thus substantially the same accessibility may be provided for the engine compartment as is permitted in a conventional vehicle. Furthermore, since the lights are in the forward ends of the housings, the front ends of the "valleys" are unobstructed and afford added road visibility, particularly for the occupants of the front seat. It is evident, however, that these valleys may be omitted, if desired, and that the sides of the hood may extend over or be directly juxtaposed to the longitudinal housings.

The provision of housings of this character at each side of the vehicle permits several advantageous improvements which are particularly desirable in a streamline vehicle, and especially one of the convertible type. For example, there is adequate room to arrange the door hinges within the housing so that they are concealed and do not tend to increase the air resistance of the vehicle. If a single door is provided, as in the recommended form of the present invention, such hinges must be arranged to afford a sturdy support for the relatively long and heavy door.

Furthermore, the arrangement of the longitudinal housings permits the provision of relatively wide seats, and particularly a wide front seat, without a resulting objectionable appearance in the vehicle, even if the vehicle has a short wheel base. The housings also may have structural parts therein to afford sturdy protection from possible blows at the sides of the vehicle. Thus tubular members may be arranged in each housing materially to increase the strength of the door and adjoining portions of the vehicle side wall. Particularly, when a body of the convertible type is provided with a single long door upon each side, a housing of the type described permits the door to have an adequate cross section to afford proper strength and stiffness. Thus, while the windshield arrangement facilitates employment of a single long door to afford convenient access to both the front and rear seats, the housing arrangement permits such a door to have suitable structural characteristics.

To assure the maximum aerodynamic stability of a motor vehicle and to enhance its streamlining, it is desirable for the vehicle to have a low over-all height. One of the factors which determines the height of the vehicle is the depth of its frame. The stiffness of the frame depends largely upon its depth. It is possible to make chassis frames of substantially less depth than those now ordinarily employed, which will have abundant structural strength to support the weight of the body and other portions of the vehicle, but such frames are likely to be objectionably flexible, unless they are made unduly heavy. To permit the vehicle top to be disposed in a relatively low position, without sacrifice of head room, I prefer to provide a frame of substantially less depth than otherwise would be desirable, but to arrange the parts of the body structure so that the frame is materially reinforced and stiffened thereby, particularly when the doors are closed, i. e., when the vehicle is in normal operation. The large housings extending along the side of the vehicle will accommodate structural members of adequate size to reinforce the frame in this manner. For this purpose such structural members may be associated with relatively heavy hinge elements at the rear of the vehicle doors, while, at the front of each door, interlocking means may be provided to secure the reinforcing or structural members of the door to other parts which are arranged in the forward portion of the housing and which are connected to the chassis frame. Thus the stiffness of the latter is substantially enhanced and the frame may have substantially smaller depth than otherwise would be desirable. Such an arrangement of the doors to afford structural reinforcement for the frame may be employed in all types of vehicle bodies, but it is particularly advantageous in bodies of the convertible or open type, wherein the top structure cannot be depended upon to stiffen the chassis frame.

Preferably the front extremity of the housing at each side of the vehicle is in the form of a casing extending back from the lens of the headlight and over the front portion of the front mud guard which is concealed by the housing. Behind this front section is a removable sheet metal portion which may enclose a relatively large storage space. This storage space may be used to receive a spare tire or wheel, and its sheet metal cover may be readily removable, having its inner edge normally disposed under and held in place by the lower edge of the hood, while its outer portion may be secured in place by suitable readily operable fastening means. When this portion of the housing is removed, the interior of the front section is made accessible, thus permitting access to the rear of the headlight.

This portion of the housing may also conceal a ventilating duct which receives air from the front of the vehicle, thus relieving air pressure where it is relatively high during normal operation of the vehicle, and supplies air through the cowl to the passenger compartment. Furthermore, this portion of the housing may be effective in enclosing and concealing a ventilator for the engine compartment, which receives air from the radiator and emits it beneath the housing.

At the rear of the vehicle, a swinging closure may be arranged in the side wall of the housing, being disposed outwardly of the rear wheel and extending back of the same. In its normal position this closure is effective in concealing the upper part of the rear wheel and thus cooperates with the remainder of the housing in affording a substantially smooth surface along the major portion of the side of the vehicle. This closure may be arranged to swing outwardly to afford access to a storage compartment located in the streamlined rear portion of the housing; and, when the closure is swung outwardly, it may be lifted out of engagement with its hinge support to permit ready access to the rear wheel.

The vehicle door may be provided with a lateral extension which forms a part of the housing and which not only affords adequate room for the structural portions that reinforce the frame, but also provides room for the window to move downwardly and outwardly. Accordingly, the side windows of a vehicle of this character may be curved to enhance streamlining and appearance, and they may also be inclined upwardly and inwardly. Thus the width of the top may be reduced and the air resistance of the vehicle may be lowered, while the stability of the vehicle when subjected to side winds is enhanced.

In accordance with this invention, the lifting and guiding means may direct the curved window forwardly and outwardly so that it readily moves in a curved slot of normal dimensions in the top of the door. The housing portion which is associated with the door affords adequate room for a window and guiding mechanism of such a character. Such a mechanism may include straight guide elements, such as tubular members, to define the path of the panel. It is desirable, particularly when a single window panel is employed, to provide a heavy counterbalancing spring substantially to balance the weight of the window and its movable parts. Such a spring apparently must be relatively large and bulky, and it may conveniently be disposed in one of the tubular structural elements that is located in the door portion of the housing.

Due to the arrangement of the windshield standard assemblies beside the front seat, it is desirable to have the maximum dimension of such a post located at an angle of the order of 45° to the longitudinal axis of the vehicle and its minimum dimension disposed substantially at right angles to its maximum dimension. Thus a sturdy front-post construction may be afforded of the general character, for example, disclosed in my prior Patent No. 1,931,572, to cause the minimum obstruction to visibility.

In the preferred form of my invention, the handle for operating the window lifter mechanism may be movable upwardly and downwardly along a path defined by structure disposed within the door post. Thus a tubular member may be located in this post to reinforce the same and to guide the lifter handle, this tubular member being arranged substantially in alignment with the guide for the front edge of the window and with the retaining channel for the edge of the windshield so that these parts have relative locations to afford the minimum obstruction to vision. The housings at the side of the body permit the shaping of the upper part of the body so that the relatively large front posts may be arranged in this manner without impairing the appearance of the body.

The above and further objects and advantageous features of the invention will be apparent to those skilled in the art upon a reading of the subjoined description and claims in conjunction with the accompanying drawings, in which:

Fig. 1 is a side elevation of a convertible vehicle in which the principles of this invention are incorporated;

Fig. 2 is a plan view of such a vehicle with one-half of the top removed to show the arrangement of the passenger compartment;

Fig. 3 is a plan view, somewhat diagrammatic in character, showing the arrangement of the raised side window and portions of the lifting, guiding and supporting means therefor, the lowered position of the window being indicated in dot and dash lines;

Fig. 4 is a view partly in section and partly in side elevation with the outer wall of the body removed, schematically showing the general arrangement of the components of the body in the region of the passenger compartment;

Fig. 5 is a side elevation of the rear part of the body, the rear part of the frame and associated structural portions being indicated by dotted lines, and the lowered and concealed top being indicated by dotted lines;

Fig. 6 is a rear elevation of a door;

Fig. 7 is a plan view of a portion of the body in the region of the rear part of the door, this part of the door being shown in its open position by dot and dash lines;

Fig. 8 is a sectional view showing the arrangement of the lower hinge for the door, its associated housing, and the hinge or pivotal support for the closure disposed adjoining the rear wheel;

Fig. 9 is an enlarged section indicated by line 9—9 of Fig. 1;

Fig. 10 is a sectional detail of a portion of the housing behind the door;

Fig. 11 is a side view of the door and the adjoining rear portion of the vehicle with the outer face sheets of the body wall and associated parts removed, certain parts being broken away for clarity of illustration;

Fig. 21 is a vertical section through the door, adjoining portions of the vehicle also being shown;

Fig. 22 is a section on line 22—22 of Fig. 11;

Fig. 23 is a vertical section through a portion of the lifter operating mechanism;

Fig. 24 is a view partly in section and partly in plan of the assembly shown in Fig. 23;

Fig. 25 is a detail view of a portion of the lifter mechanism and structural part of the door with parts broken away and shown in section;

Fig. 26 is an elevational detail of another part of the structural portion of the door and of the lifter mechanism;

Fig. 27 is an inside elevation of the vehicle door, the lower or secondary hinge being omitted;

Fig. 28 is a front elevation of the lower part of the vehicle door;

Fig. 29 is a section indicated by line 29—29 of Fig. 34;

Fig. 30 is a horizontal section showing the front portion of the vehicle door, the adjoining door jamb construction and associated parts;

Fig. 31 is a side elevation of one of the coupling members which is located at the front of the vehicle door;

Fig. 32 is a rear elevation of a complementary coupling member;

Fig. 33 is a side elevation of the two coupling members in their normal interlocked position;

Fig. 34 is a side assembly of a part of the front portion of the structural frame, showing the bracket which supports the windshield standard, the front door jamb construction and related parts, including a portion of the ventilating means;

Fig. 35 is a side elevation of the front part of the vehicle, the front wheel and axle being removed for clarity of illustration, and certain parts being shown in dotted lines;

Figure 41:
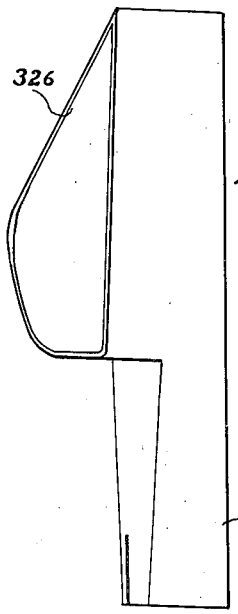
Figure 42:
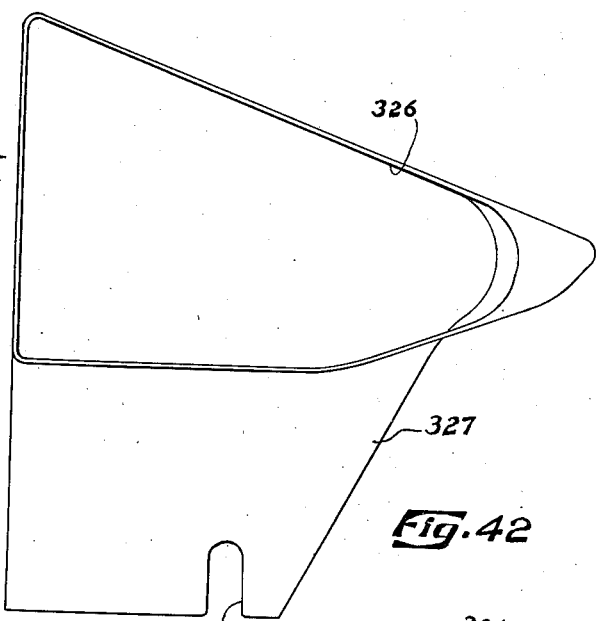
Figure 43:
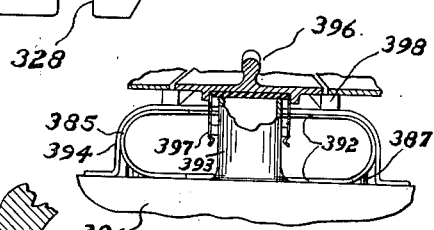
Figures 44, 45:
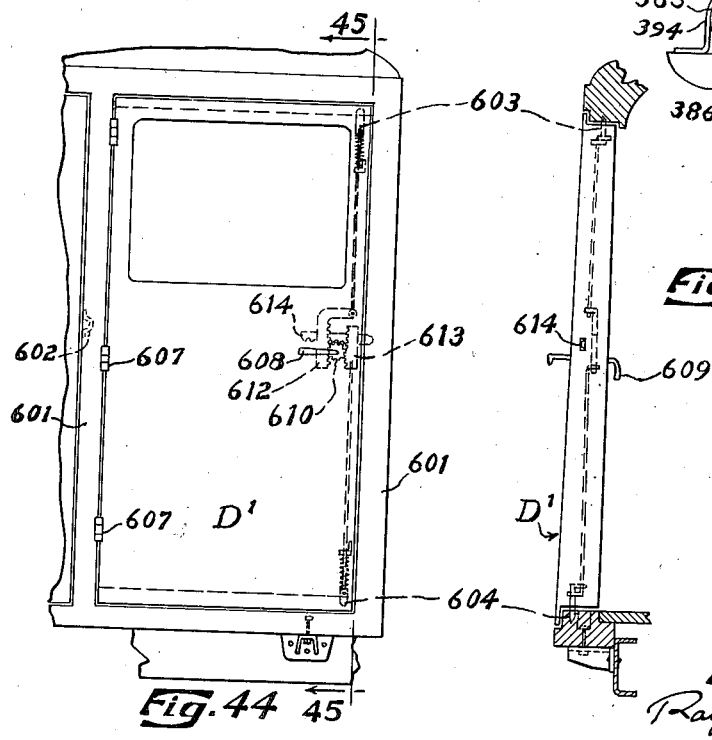

Figs. 36 and 37 are sections indicated by lines 36—36 and 37—37 respectively of Fig. 35, certain parts being removed for clarity of illustration;

Fig. 38 is an enlarged section indicated by line 38—38 of Fig. 35;

Fig. 39 is an elevational detail of the ventilator shown in Fig. 37;

Fig. 40 is a section on line 40—40 of Fig. 39;

Fig. 41 is a rear view of a ventilating housing for the engine compartment;

Fig. 42 is an inside elevation of the same;

Fig. 43 is a sectional detail with a part broken away, showing one of the ventilating means and associated parts of the radiator and radiator cap;

Fig. 44 is an elevational view, somewhat diagrammatic in character, showing an optional arrangement whereby the door may be arranged to reinforce the body and frame structure;

Fig. 45 is a section indicated by line 45—45 of Fig. 44;

Fig. 46 is a broken top view of the optional type of lifter operating mechanism, the inner side wall of the door being shown in section;

Fig. 47 is a section on line 47—47 of Fig. 46;

Fig. 48 is a transverse vertical section of an optional type of vehicle with which my improved housing and frame reinforcing structure may be employed;

Fig. 49 is a detail view, showing a part of the assembly of Fig. 48 in perspective;

Fig. 50 is a broken side elevation of a lifter and panel arrangement with which the lifter mechanism of Figs. 46 and 47 may be employed;

Fig. 51 is an enlarged section on line 51—51 of Fig. 50;

Fig. 52 is a side elevation of an optional type of vehicle with a modified form of housing;

Fig. 53 is a diagrammatic view corresponding to a transverse section of the wall of the body shown in Fig. 52;

Fig. 54 is an elevational detail of the lower part of a vehicle door provided with an optional type of coupling means;

Fig. 55 is a detail view of a portion of the bottom of the door shown in Fig. 54; and Fig. 56 is a perspective view of a complementary member arranged to be employed with an arrangement of the type illustrated in Figs. 54 and 55.

In the accompanying drawings, which are to be regarded as illustrative rather than limitative, reference characters D indicate the doors of the vehicle. The top T may be fixed or foldable; at the front of the top is a curved windshield W, at opposite sides of which are the standard assemblies S that include the windshield standards and the associated door posts. A swinging door or lid L may afford access to the rear storage compartment, and a hood I may be disposed in front of the cowl C in substantially the conventional manner. A vehicle of this type may be characterized by a housing H extending along the side of the body from the headlight to the rear portion thereof. This housing may include a front portion F which is normally fixed in position and forms a casing for the headlight. At the rear of the portion F, I may provide a removable sheet metal cover, behind which a lateral extension of the door D forms the corresponding part of the housing. At the rear of the door the housing is provided with a tapering tail portion M. The upper surface of the front section F may have a continuation in the form of a shoulder or ledge extending along the side of the body. Above this ledge, the body wall may have substantially normal dimensions. Thus the lower part of the body may have a width of the order of the maximum width of the vehicle, while the upper part of the body may be substantially narrower.

As shown in Figs. 1, 2 and 4, the windshield W may be curved and particularly have a curved lower edge, so that the lower parts of the windshield standard assemblies S are located beside the midportion of the steering wheel and the front portion of the front seat. Preferably the windshield and the posts S have a substantial inclination upwardly and rearwardly so that the upper part of the windshield may be located substantially over or to the rear of the midportion of the bottom of the front seat; Fig. 2 particularly illustrates this relationship. The upper edge of the windshield W may have only a slight curvature or may be susbtantially straight, thus permitting the top to have a minimum length. In other words, the central part of the windshield has a greater rearward inclination than its edge portions. It is evident that the lower part of the windshield curves back about the upper or front portion of the steering wheel so that the standards S are located relatively far back. A full disclosure of a windshield of this character is afforded by my copending application Serial No. 690,331, which is incorporated herein by reference.

The rear seat 10 (Fig. 4) is located in fairly closely spaced relation to the front seat 9 and preferably is arranged so that at least the bottom of the seat is disposed in front of the rear axle. The bottom of seat 10 may be disposed somewhat lower than the corresponding part of the front seat, permitting the rear part of the top T to be lower than would otherwise be feasible and yet afford adequate head room, thus enhancing the streamlining of this portion of the vehicle.

The arrangement of the rear seat 10 so that it is lower than the front seat 9 cooperates with the provision of the curved windshield W in enhancing the streamlining of the vehicle when the top is lowered. As shown, the windshield W may not only have a substantial rearward inclination as well as a lateral curvature, but it also may have a slight curvature, as viewed in longitudinal section (Fig. 4). Thus the windshield is shaped and positioned to direct the major air stream over the heads of the occupants of the low-positioned rear seat.

In order to permit adequate leg room for the occupants of the rear seat, a suitable recessed floor such as disclosed in my prior Patent No. 1,953,953 may be afforded or I may provide foot wells 12, as indicated in Fig. 4.

A single door D may be arranged at each side of the body to afford access to both the front and rear compartments. Each door D may have its front upper corner portion recessed, as indicated by numeral 14, to accommodate a bracket supporting the windshield standard. At the rear of the door an extension 15 projects from the main portion of the door, which terminates on the line 16 of Fig. 4.

At the rear of the vehicle the tail portions M of the housing H are located at either side of the main storage compartment that is covered by the lid L. Each chassis frame side rail 20 may have a rearward extension at the lower part of this storage compartment (Fig. 5). Such an extension is connected by a bracket 21 to a tubular reinforcing member 22 that is located in the housing portion M slightly below its upper surface. As also shown in Fig. 5, the top T may be foldable so that it may be lowered to a concealed and protected position beneath the lid L and between the housing portions M at each side of the vehicle. Preferably the top may be of the semi-rigid type disclosed in my copending application Serial No. 35,610, filed August 10, 1935, when folded having its front or nose portion swung at an angle of substantially 45° to the adjoining part thereof. This top may be manually removable and movable to its folded or concealed position, or it may be guided by suitable track elements or mounted on suitable swinging arms, as more fully disclosed in that application.

Preferably the door D supports a single long window panel P which may extend along substantially the entire portion of the passenger compartment behind the post S, as shown, for example, in Fig. 4. This window P has a longitudinal curvature to enhance the streamlining of the vehicle, while it also inclines upwardly and inwardly, permitting the top T to be relatively narrow. Thus the top may be more readily received in concealed position, while it affords less wind resistance when raised. Furthermore, the inclination of the windows reduces the effect of side winds upon vehicle stability. The upper edge of the window extends back from the post S in a substantially horizontal direction, then curves downwardly with the curvature increasing toward the rear. Thus the windows when raised are shaped so that they substantially enclose the region of still air behind the windshield; accordingly, the windows do not have rear corners projecting into the main air stream.

The rear extension 15 of the door serves to support the rear part of the panel P, as shown in Fig. 4. The extension projects rearwardly from the inner part of the rear portion of the main door structure, as illustrated in Figs. 6 and 7. This sheet metal extension may be relatively narrow at its upper end, as particularly shown in Fig. 6. Its inner wall may be curved, as indicated by numeral 30 of Fig. 7. The hinge axis of the door, which is indicated by line a—a of Figs. 6 and 11, preferably is located outwardly of the extension 15 and is so disposed that the extension may swing inwardly without projecting more than a slight distance, for example, of the order of an inch, into the rear compartment, when the door is opened. The position of this extension when the door is opened is indicated by dot and dash lines in Fig. 7.

Preferably the curved inner wall 30 of the extension is provided with suitable padding 34 which may afford a cushion for the side of the rear seat, and which may extend somewhat below the extension. From the rear part of this padding a suitable sheet 36 of leather or the like extends in a rearwardly projecting loop disposed beside the end of the back of the rear seat; the inner end 33 of this sheet is secured, as indicated in dotted lines, beneath the margin of a portion of the covering of the seat back. When the door has swung to its opened position, the sheet 36 is extended to the position indicated by dot and dash lines, thus affording a protective covering for the space which would otherwise then be presented between the fixed portion of the body wall and the end of the door.

The hinge axis is located so that the raised window P and the door extension 15 may project for a substantial distance to the rear of the main part of the door. Yet when the door is opened, its end portion does not project substantially into the region in front of the seat back. Thus even if an occupant of the rear seat is resting against the cushion 34 as the door is swung open, he is only slightly disturbed by the movement of the door to the dot and dash position shown in Fig. 7.

Obviously the door may be arranged so that its major portion is located close to the rear mud guard or wheel housing. Thus a substantial space may be afforded when the door is opened to allow access to the rear compartment without necessitating movement of the front seat. The space that is thus provided is of the order of that afforded by the rear door of a conventional sedan and is indicated by the large double-headed arrow in Fig. 7, this arrow indicating the minimum distance between the front seat and the opened rear door.

Obviously the door extension 15 projects over the rear mud guard 48 (see Fig. 11), while the outer portion of the housing H is arranged to enclose this mud guard. For this purpose a swinging closure 50 (Fig. 1) may be arranged to cover the rear wheel as well as to afford access to a storage compartment in the rear portion M of the housing, this compartment being located behind the wheel housing. As shown in Fig. 9, this door may be provided with a lock 51 and with a spring catch 52 engageable with a bail-shaped element 53 secured to the floor of the compartment. A metal finish strip 54 may be mounted on the lower part of the door 50 serving to reinforce and stiffen the latter and providing a guard plate to protect the finished surface of the door against accidental scratching. Preferably the member 54 may be of bright metal, being nickel or chromium plated or being formed of stainless steel, i. e., nichrome.

The front end of the strip 54 may be rabbeted; as shown in Fig. 8, its longer, upper part 54ᵃ has an inwardly extending portion secured to a hinge block 55 which is provided with an inclined opening in which a hinge pin 56 normally fits. When the door 50 is moved out of its normal position, it may swing about the pin 56, thus affording access to the compartment at the rear of the wheel housing. When the door has been swung to this position, the block 55 may be lifted out of engagement with the pin 56 so that the closure 50 may be entirely removed from the vehicle. Thus complete access to the rear wheel may be afforded. The pin 56 preferably is supported by a block 59 secured to the rabbeted end of finish strip 54 which may, in appearance, be a continuation of the strip 54 and which is secured to the outer face of the running board 60.

The lower or secondary door hinge 65 may be located adjoining the front part of the mud guard 48, being arranged in the manner particularly illustrated in Fig. 8. For this purpose, the outer lower corner of the rear mud guard 48 is cut away, as designated by numeral 49, and a small sheet metal housing 66 is secured to the edge of the cut-away portion and to the end of the running board. This housing is shaped to enclose the rear part of the secondary hinge 65 and preferably is located outwardly of the plane of the rear wheel, although it projects into the chamber surrounded by the rear mud guard or wheel housing 48. The sheet metal housing 66 is arranged to protect the end of the door against mud thrown from the rear wheel.

The hinge 65 has a lower leaf 65ᵃ which extends from a bracket 62 that supports the running board 60, while the upper leaf 65ᵇ of the hinge extends inwardly and is secured to the rear of the body portion of door D (Figs. 6 and 8). Preferably this hinge cooperates with a primary hinge 70 (Fig. 11) in defining the hinge axis a—a, which may be inclined inwardly or outwardly in a lateral direction, but which preferably, as shown in Fig. 6, may lie in a vertical plane. In any case, as shown in Fig. 11, this hinge axis preferably has a substantial rearward inclination, while the rear of the body portion of the door may also incline rearwardly and extend over the front part of the mud guard 48 and the extension 15 may extend even over the midportion of this mud guard, i. e., over the rear axle.

The inclined arrangement of the hinge axis and its disposition adjoining the outer portion of the housing aid in permitting the extension 15 to swing in the manner described in connection with Fig. 7 so that an occupant of the rear seat is not substantially disturbed when the door is opened. Obviously the part of extension 15 which lies to the rear of the hinge axis tends to counterbalance a part of the weight of the major portion of the door projecting forwardly therefrom.

The primary hinge 70 has a heavy knuckle portion 71 (Fig. 12) that is secured to the front end of the tubular member 22. This member 22, as previously described, may extend downwardly and rearwardly to a connection 21 with the rear part of the chassis side rail. A bolt 80 (Fig. 11) may connect the upper portion of the mud guard 48 to member 22, while an upright 81 may extend upwardly from the chassis frame and may support a bracket 82 which is associated with a bolt and an encircling band 84 that are effective in securing the member 22 to the upright 81. A transverse structural member or channel 86 may connect the uprights 81 at opposite sides of the vehicle.

Figure 12:
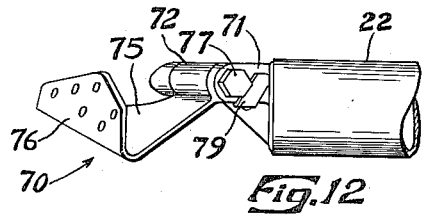
Fig. 12 is a plan view of the primary door hinge and the associated structural portion of the body.
Figure 13:
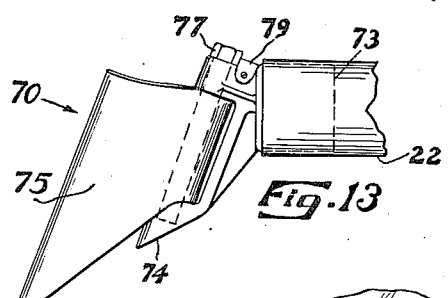
Fig. 13 is a side elevation of the same.

The arrangement of the hinge 70 is more particularly shown in Figs. 12 and 13, the knuckle 71 having a tubular or cup-like extension 72, shown in dotted lines in Fig. 13, fitting within the end of member 22 and preferably welded or otherwise secured thereto. The knuckle 71 is provided with a downwardly projecting portion 74 located substantially below the end of tubular member 22 and shaped to rest upon the upper surface of the mud guard 48, as shown in Fig. 11.

Figure 20:
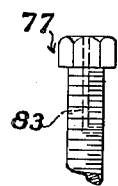
Fig. 20 is an elevational detail of the pintle member of the primary hinge.

Received by the knuckle portion 71 of the hinge is the large leaf member 75 which has a barrel 72 and which is curved as shown in Fig. 12, terminating in an inclined flat plate portion 76 that is secured to the rear of the door D; see Fig. 6. The plate 76 has a substantially greater depth than the barrel 72 of the leaf member 75. While the hinge 65 aids in supporting the weight of the door, the major portion of the supporting effect is afforded by the primary hinge 70, the lower hinge mainly aiding in keeping the hinge axis in proper position in relation to the neighboring parts of the structure. In order to effect adequate support for the door, the pintle of the hinge 75 is in the form of a threaded bolt member 77 which is fixed in threaded parts of the knuckle 71. The barrel 72 may have an internally threaded bore or it may contain a threaded bushing of suitable bearing metal to engage the pintle bolt 77. Thus a construction is provided not unlike that commonly employed in vehicle spring shackles, the thread of the bolt 77 providing a relatively large bearing area for supporting the weight imposed thereon. In order to prevent possible loosening of this bolt, a removable lug 79 is secured to the upper part of the knuckle and extends between the head of the bolt and an adjoining face of the knuckle bracket. As shown in Fig. 20, the pintle bolt 77 may be drilled, as designated by numeral 83, to permit lubrication of its wearing surface and the cooperating internally threaded portion of the barrel.

To afford access to the bolt 77, the pad 34 and the sheet 36 which are associated with the door extension 15 may be removed, but I prefer to provide a removable closure 88, shown in Figs. 2 and 10, which is normally held in place by spring clips 89 engaging a suitable sheet metal reinforcement 90 of the opening in which the closure is received. Obviously this closure may be removed when a suitable tool such as a screw driver is employed to pry one of its edges away from the housing. In its normal position, as shown, the closure lies flush with the surface of the adjoining sheet metal of the housing. Obviously when this closure is removed, it uncovers the head of bolt 77 so that the latter may be removed after the lug 79 is disconnected from the knuckle. The lower hinge 65 obviously may be rendered accessible by the removable housing 66.

When door D swings open, the members 22 and 86 are effective in opposing the strain thus imposed upon the hinge 70, while the bracket 62 supports hinge 65; thus the strains are transmitted to various parts of the chassis frame. Due to the inclination of the hinge axis, the door end moves downward slightly as it moves outward. The arrangement of housing H permits the provision of a sturdy hinge construction in concealed position, although it is spaced outwardly a substantial distance from the inner face of the door. This arrangement cooperates with the inclined hinge axis in permitting the extension 15 to be relatively long and yet to swing inwardly without materially disturbing an occupant of the rear seat. Furthermore, the inclined axis permits the inner face of the door to swing to an inclined position, thus affording additional room adjoining the inclined back of the front seat. In its opened position, the rear corner of the door remains over the running board; obviously this arrangement aids proper closing of the door, even should the hinge means become badly loosened or worn. If desired, a roller may be mounted in the bottom of this part of the door to engage a track or surface on the running board, thus to aid in supporting the weight of the opened door.

Figure 14:
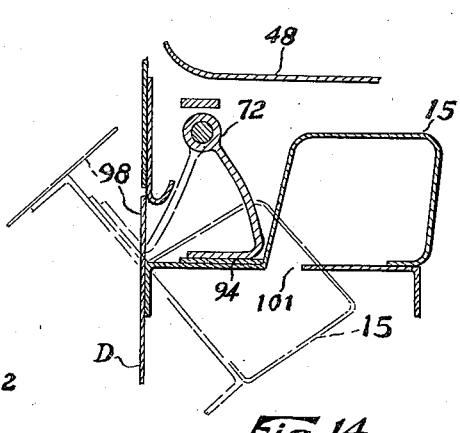
Fig. 14 is a horizontal sectional detail of this hinge and the adjoining portion of the door and associated parts, the open position of this portion of the door being indicated by dot and dash lines.

In order to permit opening of the door with its hinge axis somewhat to the rear of its box-like body portion, a flange 98 extends rearwardly from this portion to cooperate with the end of the door and adjoining parts of the body wall in enclosing a space, as shown in Fig. 14. Above the housing the upper, narrower part of the doors is provided with a narrow rearwardly extending portion 100 (Fig. 6), a slot 101 being provided to receive the lowered panel P. The rear of the small extension 100 is substantially aligned with the edge of flange 98, thus affording the advantageous appearance of a continuous upwardly inclined edge at the rear of the outer part of the door.

It is evident that the rear edge of the flange 98 is nearly as far back as the hinge axis $a—a$ and that the front of the mud guard 48 defines the back of the lower part of the door opening, these factors cooperating with the arrangement of the inclined axis in affording an opening of maximum width behind the front seat.

Obviously, as shown, the housing H need not extend for the full height of the side of the body or of the door D. Thus a substantially horizontal shoulder extends along the body and tends to enhance its appearance of length. Located within the door and below this shoulder may be a tubular reinforcement 92 (Fig. 11) which in effect forms an extension of the tubular member 22. The rear end of this reinforcement may extend through the bight portion of an inclined channel 95 that forms the rear of the major box-like portion of the door, the reinforcement being welded to this channel and to a reinforcing plate 94 (Fig. 6) to which the plate portion 76 of the primary hinge is secured. Furthermore, one leg of the channel 95 may be slit at its upper end and wrapped about and welded or otherwise secured to the member 92, as designated by numeral 97. Thus an unusually rugged connection of the hinge to the main structural member 92 of the door is afforded.

A second tubular structural member 102 preferably is located in the door D, being disposed substantially below the member 92 and inclined downwardly and forwardly. As shown, this member 102 may have a somewhat smaller diameter than the member 92, its rear end projecting through and being firmly secured to the plate 94 and channel 95. Brackets 43 and 44 may extend inwardly from the member 102 (Fig. 3) to support the lower ends of the tubular panel guide members 40 and 41. The upper ends of these members are welded to a longitudinally extending tubular member 104 (Figs. 15, 16 and 21) which is located at one side of the slot through which the window moves, the sheet metal of the narrower upper door structure being welded or otherwise secured to this tubular member.

The members 40 and 41 preferably have different inclinations both longitudinally and laterally of the vehicle. Thus the member 40 may have a greater longitudinal and lateral inclination but may have less vertical extent than the member 41. These parts are arranged to direct the window panel P from the full line position shown in Figs. 3 and 11 to the dot and dash line position shown in these figures. Thus the rear end of the panel moves downwardly and forwardly until it is located in its lowered position adjoining the rear of the main part of the door, while the front portion of the panel may move in a suitable guideway arranged in the front post of the door and having an extension 105 below this post (Fig. 11). Both the front and rear portions of the panel may move outwardly as well as downwardly. Due to the lateral inclination of the panel, such a compound movement causes the upper curved edge of the panel to pass through or be received by the curved slot in the top of the door without necessitating provision of an unusually wide slot for this purpose. Thus, as illustrated in Fig. 3, the position of the upper edge of the lowered panel substantially conforms to the position of the lower edge of the raised panel.

During its downward movement, the panel swings slightly as is evident from comparison of the full and dot and dash line positions of the panel shown in Fig. 11, it being obvious that the front end of the panel moves through a greater vertical distance than its rear end. Thus the center of gravity of the panel moves a distance which is less than the maximum height of the panel. The panel also turns slightly, as viewed from above, the outward inclination of the member 40 being greater than that of the member 41, although the former is shorter than the latter. This arrangement is due to the curved and inclined shape of the panel and the corresponding curvature of the slot in the door, the result being that the upper edge of the panel is brought into proper position in the door slot.

Figure 15:
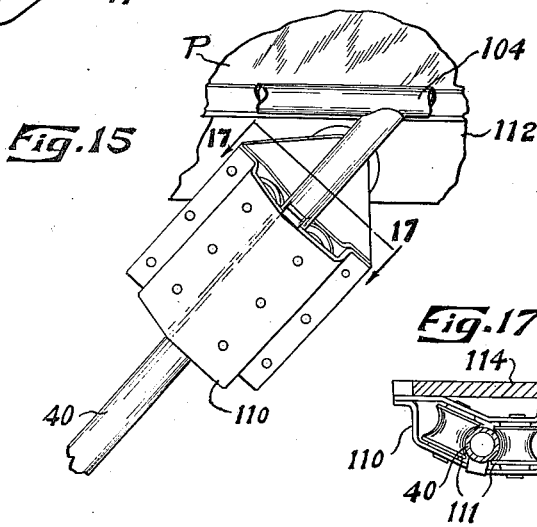
Fig. 15 is an elevational detail of a portion of the panel and a portion of the lifting, guiding and supporting means associated therewith.
Figure 16:
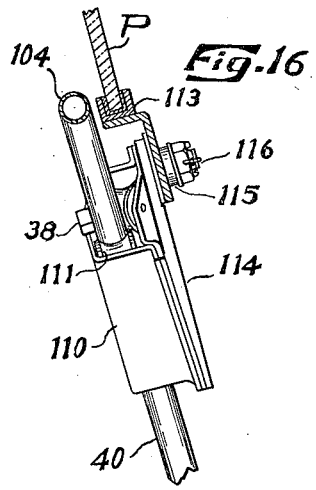
Fig. 16 is an end elevation of the assembly shown in Fig. 15, parts being shown in section.
Figure 17:
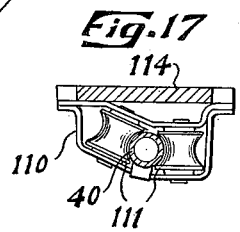
Fig. 17 is a section on line 17—17 of Fig. 15.

To permit these desirable results and yet to permit the employment of simple straight guiding elements 40 and 41, I provide housings 110 (Figs. 15, 16 and 17) which support a plurality of rollers 111 arranged to engage a tubular guide 40 or 41. As shown in Figs. 15, 16 and 17, the axes of the rear set of rollers may be located substantially at right angles to the direction of extent of the adjoining part of the panel, while the other set of rollers may have their axes inclined outwardly and rearwardly, thus being better able to support the panel upon the inclined guide rod. The inner and outer plates of the casing 110 are secured to an angular plate 114 at the rear of the panel, while a corresponding, somewhat differently shaped plate 114ª (Fig. 21) is secured to the casing at the front of the panel.

A metal angle 112 may be secured to the channel frame 113 at the bottom of the window panel and may be pivotally connected to the housings 110. For this purpose bushings or bosses 115 may be secured to or extended from the angle 112, and parallel studs 116 may extend from the plates 114 and 114ª through the bushings and corresponding openings in the angle 112 to complete the pivotal connections.

Obviously the distance between the pins 116 is fixed and a pivotal movement may occur between the casings 110 and the panel, including the member 112, as the panel moves upwardly or downwardly. Thus movement of the panel from the full to the dotted line position is permitted, it being evident that the guides 40 and 41 are inclined relative to each other so that their horizontal spacing is greatest at their upper ends. The up and down turning movement which is illustrated by the dotted and full line positions of Fig. 11 is accommodated in this manner. The slight lateral swinging movement results from the different lateral inclinations of the guides and is permitted by turning of the rollers 111 in relation to the axis of the corresponding guide. Thus, instead of following a straight-line path, each roller may follow a slightly helical path as it moves along the corresponding guide. Obviously since the distance between the pivot elements 116 is fixed, the proportional speeds of the members 110 do not remain the same throughout their paths.

Figure 19:
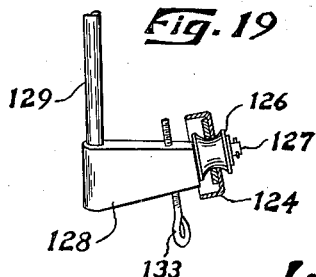

A bracket 120 is mounted upon the bottom of the door D and pivotally supports a lifter member 123 that has the general form of a large bell crank. The shorter arm 124 of this member is provided with a slot 125 and is suitably reinforced to engage a roller 126 (Fig. 19) that rotates on a stub shaft 127 projecting from a block 128. The latter is secured to the lower end of an operating rod 129 which extends upwardly into the door post and is connected to a suitable handle.

Figure 18:
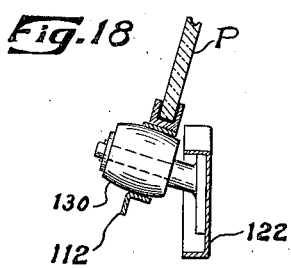
Figs. 18 and 19 are enlarged sectional details of the lifting mechanism.

The longer arm 122 of the member 123 supports a barrel-shaped roller 130 that engages a slot 132 in the angle 112 of the panel P (Fig. 18). Portions of the angle provide flanges above and below this slot so that there are substantial surfaces to engage the barrel-like surface of the roller 130. Preferably the member 123 swings in a plane which has a lateral inclination less than that of the panel, the wide, barrel-shaped roller 130 being properly engageable with member 112 despite this angular relationship.

An eye-bolt 133 is connected to the block 128 and receives the looped end of a cable 134 which, as shown in Figs. 3, 11 and 26, passes beneath a guide pulley 136 and about a pulley 137 that is supported upon the lower tubular member 102. A suitable slot 138 is provided in member 102 to receive a portion of the pulley 137, as shown in Fig. 26, so that the cable 134 may extend into the tubular member and be connected with a large counterbalancing spring 140, indicated in dotted lines in Fig. 11, which extends for the major portion of the length of the member 102. Since the panel P is relatively long and heavy, the spring 140 is formed of relatively heavy gauge wire properly to counter-balance the weight of the panel. The rear end of the spring is hooked over the bight portion of a strap metal member 141, the outturned ends of which are received in slots or notches 142 in the rear of member 102 which projects beyond the reinforcing plate 94 at the rear of the door (Figs. 25 and 6). It is thus evident that the spring is accessible at the rear of the door.

Obviously the spring 140 is connected to the shorter arm 124 of the lifter member 123 by the cable 134, the block 128, and roller 126 so that the effect of the spring upon the member 123 varies in accordance with the angular position of the arm 124 and the position of the roller in slot 125. The effective tension of the spring varies in accordance with Hooke's law, while the torque imposed by the panel P upon the longer arm 122 varies in accordance with the angular position of that arm, being at the maximum when that arm is horizontal.

These various factors are so correlated that the spring may substantially counterbalance the tendency of the panel weight to rotate the member 123 in all of the positions of the latter. For example, when the panel P is in its raised position, the full effect of its weight does not tend to turn the arm 122, a portion of this weight being supported by the arm 122 but being represented by a component of force extending from the barrel roller 130 to the pivotal support for member 123. Under these conditions, the spring 140 is nearest its normal unstressed condition, while the roller 126 may be at the outer end of the slot 125, these various factors substantially balancing each other so that the tension of the spring when nearest its retracted position is effective in opposing the component of the panel weight which tends to turn the arm 122.

When the parts are at the opposite ends of their respective paths, the panel P is tending to impart nearly the maximum amount of torque to the swinging member 123 and is opposed by the tension of the spring 140 as it is stretched to the maximum extent and therefore casts a substantially greater pull upon the cable 124. Under these conditions, the roller 126 is near or at the inner end of its path, these factors being so related that at this point as well as at intermediate points the panel weight is almost exactly balanced.

From the foregoing, it is evident that the spring 140 is stretched to the greatest extent when the panel P is at its lowest position and is tending to impart substantially the maximum torque to member 123, while the spring is stretched the least when the panel has the minimum tendency to turn member 123. However, between these limits, the tendency of the panel to turn the lifter arm does not vary uniformly with uniform changes in angular position of the arm. Thus as the longer arm 122 rises from its lowest position to horizontal position, the tendency of the panel to turn the arm increases slightly, while the spring tension is slightly decreased; however, to offset the decrease in tension, the cable 134 is disposed more nearly at right angles to the arm 124, thus tending to increase the effectiveness of the spring in imparting torque. As the short arm 124 continues to swing downwardly, roller 126 starts to move outwardly in slot 125, thus tending to increase the effective leverage of that arm, while the angle between the cable and the arm becomes somewhat less favorable. In the meantime the tendency of the window to turn member 123 is decreasing more rapidly as the panel approaches the top of its path. When the panel is in its uppermost position, the roller 126 is at the outer end of its path, but the angle between the cable and arm is unfavorable and the spring is under minimum tension.

Thus, not only at each end of the panel path may the spring provide a proper counterbalancing effect, but a compensating effect is provided by the variable length of the radius through which cable 134 acts and by the changing angle of the cable and arm, thus permitting the spring 140 to balance the panel weight, despite the non-uniform change in the tendency of the same to rotate member 123 during uniform changes in angular position of that member. In so far as I am now aware, no satisfactory general rule or formula can be provided for employing the variable factors named herein for various individual designs. But I have pointed out several factors which may be varied, so that individual designs can be provided wherein the panel is almost exactly counterbalanced by a spring throughout the panel path.

Preferably, as shown, upper and lower stops 38 and 39 are provided on guides 40 and 41 to limit the panel path, while the roller 130 is arranged to engage the lower part of the panel below the general region of its center of gravity.

Since the panel weight is almost exactly counterbalanced throughout its path, despite the natural limitations imposed upon the use of a counterbalancing spring by Hooke's law, and since the center of gravity of the panel moves through a distance smaller than its maximum height, the lifter may be operated by a single movement of a handle moving through only a moderate distance. Obviously, the facility with which the panel may be moved is aided by the employment of rollers 111, 126 and 130 to reduce friction. The operating handle may be associated with the door post that forms a part of the windshield standard assembly S. This assembly is shown in section in Fig. 22 and includes a channel-like windshield standard proper 150 which may be of sturdy construction and have a relatively wide bight portion disposed at an angle of substantially 45° to the median plane of the vehicle as viewed vertically.

Obviously this channel may have a rearward inclination and a slight curvature to conform to the desired positioning and shape of the windshield. Secured to the front flange of the channel 150 is a light metal channel 151 which receives the edge of the windshild W, suitable bolts or fastening elements 153, one of which is shown in Fig. 22, being arranged to permit the flanges of the channel 151 to be drawn toward each other so that the margin of the windshield glass is gripped by the rubber filler 154.

The door post 160 which also forms a part of the windshield standard assembly S may have its front portion curving around and extending substantially in front of the small channel 151 to enclose and at least partially to conceal the standard after the manner taught in my prior Patent No. 1,931,572. The major portion of the outer surface of the door post 160 may extend substantially parallel to the bight portion of the channel 150, these portions of the assembly substantially defining the outer limits of its minimum dimension which is disposed transversely to the normal direction of vision of the occupant of the adjoining end of the front seat of the vehicle. This part of the post, however, is provided with a channel portion 161 receiving a suitable cushioning channel 162 in which the front end of the glass panel P may slide. The channel 161 and the cushioning material 162 may be arranged so that a slight lateral swinging movement of the front margin of the glass may occur as it moves upwardly. The rear part of the post 160 encircles and substantially encloses a metal tube 170 which may extend upwardly to the upper end of the post and may extend downwardly to a suitable anchorage in the door proper. The lower part of this tubular member 170 is slotted and the sheet metal of the door post is similarly cut away to cooperate in defining a slot, generally indicated by numeral 171. This slot defines the path of the lifter handle 174 which may have a ball-like extremity and a flat metal shank portion 175 extending through the slot and terminating in a cylindrical enlargement or barrel portion 176 which receives the threaded upper end of the operating rod 129.

At either side of the shank 175 adjoining the barrel portion 176, I may provide suitable teeth 178 which engage teeth 179 upon two rack-like portions of the tubular member 170 (Figs. 22, 23 and 24). A cup-like member 190 of distortable sheet metal is held by a collar upon the operating rod 129 and has a flattened front portion 191 to clear the rack elements 179. This distortable member also has an inturned upper flange and contains a rubber block 194 through which the upper end of rod 129 extends. When the handle 174 is grasped by the operator of the lifter mechanism, the normal tendency is to press forwardly or toward the windshield standard, which results in movement of the toothed elements 178 out of engagement with the teeth 179 and the distortion of the members 190 and 194. Thus the teeth 178 and 179 are disengaged so that the handle 174 may be slid upwardly or downwardly to move the operating arm 129 and thus swing the lifter member 123. As soon as the handle is released, the rubber member 194 and its metal shell 190 are effective in pressing the toothed elements 178 into reengagement with the elements 179, thus locking the window in its adjusted position and preventing undesirable tampering with the window when it is raised and the vehicle is left in locked condition.

The members 190 and 194 are readily distortable to permit them to conform to the varying curvature of the tube 170. The handle 174 is moved downwardly when the window is being raised and moved upwardly when the window is being lowered. Let us assume, for example, that the window is raised and that the driver, having his left hand in normal position upon the steering wheel, desires to give a hand signal. He merely needs to move his hand a few inches to engage handle 174, which is at the bottom of post 160; thereupon he moves the handle upwardly to lower the window until he can extend his hand to signal. When he moves his hand back, he again grasps the handle 174 and moves it downwardly to a point near the steering wheel, thus closing the window and returning his hand to the region of the steering wheel.

While the described arrangement of a single window is desirable from the viewpoint of streamlining, it is also particularly advantageous in affording a simple, rattle-free closure wall which permits good visibility, without intermediate posts, separately movable sections, etc., with their complications and impediments to clear vision. Furthermore, the curvature and inclination of the window and windshield permit the top to be relatively compact, and thus more readily foldable and concealable in the rear storage compartment.

Referring to Fig. 21, it is evident that the upper part of the door above the shoulder provided by channel H may have a generally normal thickness and shape, this part of the door being reinforced at either side of the window slot by the tubular member 104 and a corresponding member 104a. Fig. 21 also illustrates the shape of the plate 114a which is associated with the casing 110 for the forward portion of the panel P. As shown in this figure, suitable packing such as felt or other fibrous material 200 may be disposed between the large tubular reinforcement 92 and the adjoining shoulder portion of the sheet metal of the housing H; in practice, similar packing may also be employed over the member 22 and over the corresponding part in the front of housing H. As shown, the members 92 and 102 are positioned near the outer part of the vehicle, thus being adapted to receive the shock of collision in case of accident.

The movement of the panel P down an outwardly inclined path, as defined by members 40 and 41, particularly facilitates the arrangement of an elbow receiving recess of substantial size in the inner face of the door. Such a recess may be defined by a suitably shaped sheet metal plate 201, the lower part of which is secured to the bracket 120 and the upper part of which is secured to the sheet metal upon the inner side of the door slot. Obviously this recess may be lined with suitable upholstery material.

Below the elbow recess, I may provide an extension of this material in the form of an arm-rest 203 so that a surface of substantial width, partially within the outline of the door and partially located inwardly of the same, is afforded to support the elbow or forearm of the operator of the vehicle. The cushioning material within the arm-rest 203 may be particularly adapted to support a vertical force such as imposed by the weight of the arm of the driver of the vehicle or occupant of the seat, while being readily compressible laterally to permit more convenient accommodation of the occupants of the vehicle, particularly when three persons are received in the front seat. For this purpose the cushioning material may be in the form of layers or sheets of sponge rubber having vertically disposed pellicle portions cemented to each other and imparting considerable vertical stiffness, although being readily compressible laterally.

Suitable storage spaces may be provided in the door at either side of the bracket 120. Thus a relatively large sheet metal storage compartment 205 is located at the rear of the bracket, as shown in Figs. 11 and 21, while a smaller compartment 206 may be located in front of the bracket. As shown in Fig. 27, suitable closures of leather or other finishing material may be arranged to cover these compartments, which may be made accessible by slide fasteners located beneath extensions of the finishing material of the door. Thus, as shown in Fig. 27, a flap 208 is associated with the compartment 206, this flap being rendered accessible by a concealed slide fastener (not shown) operated by a tab 209, while similarly a large flap 210 may act as a closure for the receptacle 205, being adapted to be released or connected to the adjoining portion of the door by a tab 211 associated with another concealed slide fastener.

As previously explained, the inner front portion of the door is recessed, as indicated by numeral 14, to accommodate the bracket which supports the windshield standard. The tubular member 170 extends downwardly to the bottom of this recessed portion of the door and is encircled by a part of the sheet metal of the door. This portion of the door is also shaped to provide a channel 216 affording an extension of the channel 161 of the door post (see Fig. 28).

Below the recess 14 I arrange the inner door handle 220 which may be pivoted upon a bracket 219 fixed to the front wall of the door and may have an extension 221 extending through an opening 222 in the front wall of the door, as shown in Fig. 28. The latch casing 225 may be secured to the front wall of the door by conventional means and may be connected to the latch handle extension 221 by any desired linkage. Upon the outside of the door an exterior handle 227 may be provided above the shoulder afforded by the housing portion of the door. The latch bolt 228 may be of generally beveled form as is conventional, but may have its upper and lower edges tapered so that, when the door is closed, it fits firmly into the corresponding socket, which may have a complementary, tapered shape, thus more firmly to lock the door in position. A swinging plate 218 may be swung under handle 220 to lock the door upon the inside.

Secured to the front ends of the members 92 and 102 are coupling elements 240. These elements may be similar except for their suitably shaped extensions which are set at somewhat different angular positions and are welded in interfitting engagement with the ends of the corresponding tubular members 92 and 102 that project through and are welded to the front of the door. Each of these elements is provided with two transverse bores 241 (Fig. 31), the inner ends of which are gradually flared so that their maximum diameters are toward the inner wall of the door. These bores are connected with the front surface of the element 240 by slots 242 which are also enlarged at their inner ends, as shown in Fig. 28.

A channel-like door jamb plate 250 (Figs. 30 and 34) may be located in front of the door and may support coupling members 251 (Fig. 32), these members being similar except for their extensions which are connected to the door jamb assembly. Thus the upper member 251 is provided with a cylindrical extension 255 (Fig. 29) received within a tubular member 292 which forms, in effect, a continuation of the member 92, while the lower member 251 may be welded in the plate 250. The members 251 are provided with outstanding ribs 252 which support bullet-shaped enlargements 253 that are adapted to fit within the bores 241 of the corresponding member 240. When the door is closed, these parts may fit with only a slight tolerance so that upon any slight flexing of the chassis frame, the strain tending to cause such flexure is imposed upon the tubular members within the door and the associated parts. Obviously the tapered outer ends of the enlargements 253 and the flared ends of the openings 241 permit these parts readily to move into interlocking engagement when the door is closed, the ribs 252 being received by the slots 242.

Under practical conditions, as the door closes, the coupling members do not meet in perfect registration but rather strike each other glancing blows, thus tending to retard the movement of the door and performing functions ordinarily provided by the conventional dovetail and bumper arrangements commonly provided on vehicle doors.

Referring again to the general construction of the door D, it is evident, as shown in Fig. 14, that the rear wall of the door is provided by the bight portion of the wide channel 95 to which the plate 94 is secured. The sheet metal covering of the housing H projects beyond this end of the body portion of the door to afford the rear flange 98 concealing a space in which the hinge and corner portion of the door may swing when the latter moves to its opened position. It is furthermore evident that any suitable stop or check means (not shown) may be arranged in this space or at the bottom of the door to limit the angle at which the door may swing.

At the bottom of the door angles 196 extend longitudinally along the corners of its box-like body portion. These angles may be connected at intervals by cross-straps 197 (Fig. 21) which may be disposed transversely or diagonally to connect the angles. The sheet metal covering for the housing H may be turned under the outer angle 196 and secured thereto by detachable fastening means, such as hardened tapered screws, and similar fastening means may be arranged to secure the downturned upper flange of this sheet metal portion to the lower portion of the outer sheet metal covering of the upstanding door portion. Thus the sheet metal covering for the housing may be readily detachable, if desired. Obviously, however, if preferred, the ends of this sheet metal covering member may be secured to the channels at the front and rear of the door. It is evident that, if preferred, the outer face of the lower and upper parts of each door may be provided by a single, continuous sheet of metal rather than two separate sheets as in the illustrated embodiment. In such a case, a concave surface may be provided between the ledge portion and the outer part of the upper door portion rather than an obtuse-angled corner of the type shown.

At the front of the door, the channel 239 (Fig. 30) may be shaped to define the end of the box-like body portion of the door substantially as shown in Fig. 27, the lower part of this channel being substantially vertical and its upper part inclined. The sheet metal of the housing is extended, as shown in Figs. 27 and 30, to provide a flange 237 which cooperates with the laterally inclined jamb plate 250 in enclosing a substantially triangular space to receive the latch bolt 228 and the coupling members 240 and 251. The adjoining parts of the door D and jamb plate 250 are spaced sufficiently to receive the latch shaft. Within the triangular space there may be located a thumb screw 260 (Figs. 29 and 34) with its threaded shank projecting through a boss on the jamb plate 250 to engage an ear or lug 261 which is fixed to the sheet metal covering 262 of the front storage compartment provided by housing H. Thus the thumb screw 260 is rendered accessible by opening the door D so that it may be loosened and moved out of engagement with the ear 261 to cooperate in permitting removal of the sheet metal cover 262.

Referring particularly to Figs. 29 and 34, it is evident that a tubular member 270 is disposed in a diagonal position in front of the jamb plate 250, the lower end of this member being supported in a cup-like bracket 271 secured to the chassis frame 20 and its upper end supporting an inverted cup-like portion 272 of a box-like bracket 273, the rear portion of which has an end wall 274 and a flange 275 secured, as by welding, to the channel 150 of the windshield standard. This box-like bracket 273 is disposed in the recessed portion 14 of the door D when the latter is closed. The end of the instrument board 276 may be secured, as by rivets or screws, to the inner wall of this bracket. The outer portion of the closed door conceals this bracket, and the interior of the box-like portion thereof may in practice be employed as a small storage compartment, being covered with any suitable material such as a flap of artificial leather.

A tubular tie-bar 280 extends downwardly from the bracket portion 272 to a stud 284 projecting from the chassis frame 20. Spaced outwardly from the members 270, 272 and 280 is the tubular member 292 which has a flared plate 300 welded to its forward end. As shown in Fig. 29, the inner margin of this plate member extends inwardly from the tubular member 292 so that plate 300 provides an inverted recess to receive the upper part of a tire which may be supported by a shallow sheet metal well 301 set in the forward portion of the running board. The position of a tire received by the members 300 and 301 is indicated by dot and dash lines in Fig. 34.

A metal block 306 is welded to the jamb plate 250 and is provided with an outstanding extension 307 in the form of a striker plate to engage the beveled latch bolt 228. The block 306 is shaped to provide a recess having a form complementary to the contour of the end portion of latch bolt 228; accordingly, when the latch is in its normal position, it will be firmly held in engagement with the tapered walls of the latch recess. Thus the latch itself affords a certain resistance to relative twisting of the door and door jamb and tends to cooperate with the coupling members 240—251 in resisting torsional or twisting strains.

The inner wall of the channel-like jamb plate 250 is extended to engage the tubular member 270, being secured thereto by welding or detachable fastening means as desired, the relative positions of these parts being particularly shown in Fig. 30. The inner corner of plate 250 may also be secured to bracket 273 by welding. If desired, the jamb may be provided with a base plate 296 secured to the running board.

As shown particularly in Fig. 34, the front of member 300 is connected to a diagonal brace 302 which is connected to the chassis frame rail 20.

Referring to the various structural elements and members which cooperate to reinforce the frame when doors D are closed, it is apparent that a truss-like structure is afforded at each side of the vehicle. At the rear of the passenger compartment, these structures are connected by the cross member 86, while at the front they are connected by the instrument board 276. At the rear of each structure is a generally diagonally disposed member 22 connected to the rear of the chassis frame and to the upright 81 extending upwardly therefrom. The midportion of the truss structure includes the main structural member 92 of door D and member 102. At the front of the vehicle, this truss structure includes the upstanding jamb plate 250, the inclined tubular member 270, the diagonal tie bar 280, the parts 292 and 300, and the inclined brace 302. It is evident that the last-named parts also aid in supporting the windshield standard.

A metal housing 310 is mounted upon the front portion of the chassis frame 20 and affords an air duct to supply air to the passenger compartment. This duct 310 is shown in Fig. 34, its rear portion having an opening 311 which communicates with an upwardly extending duct 312 (Fig. 35) located upon the outside of the cowl and communicating with a substantially conventional cowl ventilator 313 of the swinging door type. The front portion of the housing 310 is provided with an opening 314 which communicates with a sheet metal housing 315 communicating with a swinging ventilator 319 (Fig. 37).

The inclined floor board 320 extends upwardly from the end of housing 310 to join the dash 321, these parts also being shown in dotted lines in Fig. 35. Disposed in front of the dash 321 and above the housing 310 is a portion of a hood ventilator 325, this ventilator being illustrated more particularly in Figs. 41 and 42 and having a housing providing a large opening 326 at its inner side and tapering downwardly toward the front of the vehicle. The housing thus provided above the duct 310 has a downwardly extending continuation 327 which is open at the bottom so that air received by the engine compartment through the radiator may pass into the opening 326 and thence downwardly through the continuation 327 of the housing and be exhausted into the air stream beneath the vehicle. The side walls of the portion 327 of this ventilator housing are cut away, as designated by numeral 328, to accommodate the stud 284 which engages the tie-bar 280.

The upwardly and rearwardly inclined upper wall of the housing 325 substantially defines the bottom of the "valley" between the longitudinal housing and the side wall of the hood. The hood may consist of similar halves hinged along a central bar 330 (Fig. 35) and having pivoted side portions connected to its upper portions by hinge means concealed by the beading 331. The rear edges of the upper portions 332 of the hood may extend downwardly and rearwardly from the central hinge portion, as indicated by numeral 329. Behind these portions of the hinge a part of the cowl C is visible and may be arranged to receive conventional cowl ventilators 333.

Below the beading 331 the side wall of the hood may have a straight rear edge 340, a mark or seam 341 preferably being arranged in the side of the cowl below the beading to simulate a continuation of the curved rear edge 332 of the top of the hood. The lower edge of the side wall of the hood is designated by numeral 334 in Fig. 35 and extends downwardly to a point of juncture with the forward edge 336 of this side wall. Suitable handles 337 may be arranged at opposite ends of this side wall to operate conventional hood locking devices.

The lower edge of the side wall of the hood may be arranged to engage a flange (Fig. 36) projecting inwardly from the sheet metal covering 262 of the housing H. The member 262 is provided with a flange-like extension 353 at the bottom of the valley beside the hood, this flange having a beaded edge portion which rests beneath and inwardly of the side wall of the hood, while behind the rear edge of this side wall a narrower continuation of the flange may have an exposed beading 354 resting upon a flange provided by sheet metal extensions 355 of the side wall of the cowl.

Beneath the forward portion of the sheet metal member 262 is a mud guard 360 which may be of conventional form. As shown in Fig. 38, a portion of the sheet metal member 262 may be bent upwardly to provide a lip 363, or this part of the member 262 may be regarded as providing a shallow trough receiving a rubber filler 364 to engage a portion of the edge of the mud guard 360.

Obviously when the member 262 is to be removed to permit access to the storage compartment as, for example, to permit the removal of a tire therefrom, the thumb screw 260 may be loosened to disengage the ear 261 and the side wall of the hood may be moved upwardly out of engagement with the flange 353, i. e., the hood may be moved to its open position. Thereupon the sheet metal housing may be maneuvered to disengage the lip portion 363 from the mud guard 360 so that it may be removed. At its forward edge the housing portion 262 preferably laps over an arched sheet metal supporting member 370 (Fig. 37) which is effective in holding this portion of the housing member in place and in supporting the rear edge of the stamping F that forms a shell for the headlight. Obviously there is a space between the member 370 and the mud guard 360 permitting access to the rear of the light, which is located in this shell. Obviously the storage spaces beneath housing portions 262 at both sides of the vehicle may receive spare tires, or at one side, the battery may be received in a part of this space, the remainder being arranged for general storage purposes.

As shown in Figs. 37, 39 and 40, the ventilator 319 is mounted on trunnions 380 and has a weather-sealing bar 381 fixed to its upper margin while an abutment strip 382 extends along the ventilator opening to engage the lower margin of the closed ventilator. A spring 384 is provided with clip-like portions to engage the strip 381 to hold the ventilator in desired adjusted position. The dot and dash lines of Fig. 40 show the ventilator swung to its opened position. Obviously the inner wall of the mud guard 360 together with the sheet metal covering of the same is cut away to provide the opening for the ventilator 319.

Within the hood I may arrange a sheet metal ventilating duct 385 (Fig. 35), the rear end of which extends through the dash board 321 and the front end of which is mounted upon the top of the radiator 386. A downwardly and forwardly inclined branch 387 of the duct 385 may have an open end disposed directly behind the radiator. The duct 385 may be provided with a damper 388 controlled by a handle 389 in the passenger compartment, while the branch duct 387 may similarly be provided with a damper 390 controlled by a similar handle 391 also arranged in the passenger compartment.

As shown in Fig. 43, the intermediate portion of the end of the duct 385 may be cut away, as designated by numeral 392 to accommodate the radiator filling pipe 393, a suitable sheet metal band 394 extending behind the filler snout and being secured to the top of the radiator to hold the front of the duct 385 in place. The radiator filler cap 396 may be of the hinged type and may be provided with spring clips 397 to hold it in closed position. This swinging closure or cap may be mounted on a framework 398 which extends forwardly to points of support upon the retaining member. It is evident that the ventilators 319, 333, 385 and 387 permit adequate ventilation for the body even when the windows are closed. Thus ventilating arrangements in the form of sectional windows are not necessary, and a single long window panel may be provided on each side of the body. Obviously the end of duct 385 is so positioned that it is substantially protected from the entrance of rain, while branch duct 387 may receive air that has been warmed somewhat by passing through the radiator.

Obviously, the front of a vehicle of this type may have a generally conventional form aside from the arrangement of the headlights at the front of the housings H. To aid streamlining, however, I contemplate that thermostatically controlled shutters may be arranged at each side of the radiator, so that the sides of the same may be closed under moderate temperature conditions, while the air may continue to pass through a rather narrow area at the center of the radiator. The bottoms of the valleys at each side of the hood incline upwardly and merge with the ledge surfaces of the housings, so that these portions may be generally streamlined longitudinally of the vehicle. The cross section of the vehicle in the region of the passenger compartment is characterized by a lower portion with substantially planar sides, while above the shoulders the body sides and the windows incline inwardly. At the rear of the superstructure the top may be narrower than otherwise feasible due to the inward curvature of the rear parts of the windows, and furthermore, the rear corners of the top may have a substantial curvature (Fig. 2).

It is therefore evident that the fronts of the housings H may have a generally streamlined form, particularly in horizontal section, while the front of the hood may have a similar form aside from the necessary air-admitting openings for the radiator. These three elements, i. e., the two housings and the hood, merge at the cowl. At the rear of the vehicle, the storage compartment affords a tail of half-streamlined form, in vertical section, while the rear parts of the housings have similar forms. The superstructure has a form which may be regarded as streamlined at front, particularly in horizontal section, and a rear which is generally streamlined (as viewed in vertical section). Apparently the planar faces of the housings may afford a rudder-like effect aiding the stability of the vehicle in side winds, while the compact superstructure with its generally curved and inwardly inclined front and side walls affords low wind resistance either when moving through still air or through side winds.

I contemplate that the principles of the invention may be employed in a wide variety of ways. For example, housings of the type disclosed herein may be employed in closed, convertible, or open cars having more than one door on each side, although I consider that this construction has special advantages in convertible or open bodies with but a single door at each side. Obviously such a housing arrangement can be employed in vehicles having engines at the rear; in such a case, the housings may contain passageways for cooling air received at the front of the vehicle but drawn through a radiator at the rear. Furthermore, I anticipate that various structural details may be varied in accordance with known practice or evident mechanical expedients.

Figs. 46, 47, 50 and 51 illustrate an optional form of lifter which may be employed in a body construction and with a panel arrangement of the character disclosed herein. As previously explained, due to the restricted area of the front portion of the door which is cut away to accommodate the bracket 273, I consider it preferable to avoid crank-type lifters in a vehicle body of this character. The type of lifter shown in Fig. 46 is arranged to be operable by a handle movable back and forth along a straight-line path which is substantially defined by a generally horizontal slot located near the upper edge of the door. Such a handle may have a ball-like end portion 400 connected to a plate-like extension 401 extending through the slot 402 in the side wall 403 of the door. The extension 401 of the handle preferably is provided with a bushing portion 405 which slides on a rotary main shaft 410. Frame members or brackets 411 are arranged adjoining each end of the slot 402 and have bearing portions to support the main shaft as well as four screw-threaded shafts 412. A pair of these shafts are located between the side wall 403 and the main shaft 410 and the other pair of these shafts is located inwardly of the main shaft. One shaft of each pair is located above the handle portion 401, while the other shafts are below this handle portion.

Protuberances 413 are provided upon the handle plate 401 to move into engagement with the helical grooves provided by the screw-threaded shafts 412. For clarity of illustration the handle is shown in Fig. 47 as disposed out of engagement with the screw-threaded shafts, but normally it may engage either the upper shaft of one pair and the lower shaft of the other pair or the lower shaft of the first pair and the upper shaft of the second pair. For example, the handle may be pressed downwardly to engage the last-named shafts when it is desired to lower the window.

At the forward end of each shaft is a ball clutch assembly 420. Associated with each assembly is a pinion gear 425. Thus, when the handle is pressed downwardly it may be effective through the shafts 412 and the corresponding ball clutch assemblies in imparting rotation to a main gear which is fixed to the main shaft 410. As the handle is moved forwardly it is effective through the lower shaft 412 adjoining the inner wall of the door in driving the main gear and shaft 410 through the corresponding one-way clutch assembly 420 and pinion 425, while as the handle continues to be held in this position and is moved rearwardly it rotates the oppositely threaded upper shaft 412 and is effective through the corresponding overrunning clutch 420 and pinion 425 in driving shaft 410 in the same or an anticlockwise direction. When the handle is held up and moved in a reciprocatory path, it is similarly effective in rotating the main shaft 410 in an opposite or clockwise direction.

The main shaft 410 may be associated with screw-threaded lifter rods of the character disclosed in my copending applications Serial Nos. 654,995 and 670,487, now respectively United States Patent Nos. 2,043,652 and 2,046,725. Thus, as shown in Fig. 50, the shaft 410 is connected through respective sets of gears 430 and 431 to screw-threaded rods 432 and 433. These rods may be positioned similarly to the panel guides 40 and 41 disclosed herein and described above, thus being positioned to determine and define the path of the panel.

For this purpose internally threaded members 434 may be mounted on the respective rods and may have pivotal connections 435 to lugs extending downwardly from the channel frame 436 of the window. One of these lugs may be directly fixed to the frame while the other may be fixed to a channel 437 with which the frame has an interfitting engagement so that a slight relative sliding movement may occur between the frame and the channel; see Fig. 51.

When a window is operated by mechanism of this type and is to be moved in the manner indicated herein, the gears 430 and 431 may have different ratios so that, for example, the front rod 432 may rotate more rapidly than the rear rod 433. In order to permit the movement of the opposite end portions of the panels at proportional speeds, the sliding connection provided by the member 437 is necessary. In some respects a lifter arrangement of this character is similar to that disclosed in Fig. 19 of my copending application Serial No. 670,487, now Patent No. 2,046,725, it being evident, however, that the slight turning movement of the panel in a lateral direction is permitted by the turning of the nut elements 434 on their respective screw-threaded rods.

While a housing H of the type described herein may be advantageously used on any type of vehicle and the structural reinforcement which is permitted by elements located in such a housing may be advantageous with any type of frame, I particularly regard such an arrangement as desirable when a frame of the "backbone" type is employed. Such a frame normally comprises a central tubular "backbone" with outstanding arms having their ends connected to portions of the body. Structural reinforcements of the character provided herein afford substantial strength for the frame between the outer ends of these arms and cooperate with the central backbone so that in effect the frame is provided with three longitudinal parts rather than one longitudinal part.

As somewhat diagrammatically illustrated in Fig. 48, such a vehicle may have a large tubular backbone 500 with a plurality of outstanding arms 502 supporting the floor 503, the edge portion of which takes the place of the conventional running board. The brackets which are connected to various portions of the body may also be supported by arms 502. With this type of construction a door D similar to that previously described may be employed, the reinforcing members 92 and 102 being provided with coupling members to interfit with complementary members upon the jamb so that the door affords a substantial reinforcement for the frame of the vehicle and particularly for the edge portion thereof.

I contemplate that vehicles of the type which I have described may be provided with various contributory elements to facilitate streamlining and to reduce air resistance. Thus, for example, sheets of flexible material such as rubber, may be located between the upper and lower edges of parts of the bumpers and the adjoining parts of the chassis of the vehicle, while, as shown in Fig. 48, an apron 510 of sheet material may be located beneath part or all of the chassis, thus presenting a comparatively smooth under-surface to reduce air resistance. As illustrated particularly in the enlarged showing of Fig. 49, such an apron may be secured to a suitable concealed tape 512 which is provided with one part of a slide fastener 515, the other part of which is supported upon a tape 516 secured to a retaining strip 518 that is connected to the ends of the frame arms 502. Obviously such an apron may be provided with openings to accommodate certain depending parts of the chassis, such as portions of the rear axle and/or transmission housing, or suitable boots or extensions may be provided for these members.

When it is desired to provide an arrangement so that the door affords structural reinforcement for the frame in a convertible type of vehicle, I consider it desirable to provide housings such as the housings H in order to accommodate the structural reinforcing members. However, in a conventional closed vehicle wherein the doors extend for substantially the full height of the body and wherein the framing of the top may be depended upon for some structural strength, various other arrangements may be provided.

Thus, as illustrated in Figs. 44 and 45, a conventional closed vehicle may be provided with a door D¹ and with door posts 601 provided with latch-receiving sockets 602, one of which is shown in dotted lines at the left of Fig. 44, these sockets being tapered to receive the tapered end of a substantially horizontally moving latch member or bolt in the manner described with reference to the preferred embodiment of the invention. Similar latch bolts 603 and 604 may be located at the top and bottom respectively of the door to engage similarly recessed members in the door header and door sill. The conventional hinges 607 may be located at the opposite edge of the door. Any suitable mechanism may be arranged so that the exterior handle 608 or interior handle 609 may operate the latches substantially simultaneously. Thus, as shown in dotted lines in Fig. 44, a pinion 610 may be mounted upon the latch shaft to engage rack elements 612 and 613 connected by suitable linkages to the upper and lower latches, respectively, while the main or horizontal latch bar 614 may have an edge portion in the form of a rack also to engage this pinion.

Obviously any suitable lost motion means may be provided to assure the engagement of each of the latches in its proper recess, or the outer faces of these latches may be slightly beveled rather than being straight to facilitate such an action. It is obvious that when the latches are in normal position and tightly fit within the corresponding recesses, the door is locked in place at its forward edge as well as at its top and bottom, so that when strains are cast upon the chassis frame they will be imposed to a considerable extent upon the door itself, which will be effective through the framing of the body in reinforcing and stiffening the chassis frame.

Rather than upper and lower latches of the character just described, dovetail assemblies of the type illustrated in Figs. 54, 55 and 56 may be employed. Such elements have a curvature substantially conforming to an arc drawn about the hinge axis of the door as a center. Thus, for example, a sheet metal housing 700 may be embedded in the lower part of the door and receive in telescopic engagement therewith an upwardly movable dovetail member 701, the inner end of which is of reduced size and tapered upwardly, as designated by numeral 702. Accordingly, when the door closes, the member 701 may be pressed upwardly against the action of springs 704 which are disposed in the chamber enclosed by the two members 700 and 701 and are indicated by dotted lines in Fig. 54. Thus the member 702 is capable of being pressed upwardly until its lower surface is flush with the lower surface of the door.

Set within the door sill (or the door header, as the case may be) a complementary recessed member 710 may be arranged with its deeper end open at the outer edge of the sill (or header). Thus as the door is shut, the small tapered end of the member 701 readily engages within the large open end of the member 710, the springs being effective as the door closes in permitting the member 701 to move into interfitting engagement with the member 710. Thus dovetail assemblies may be provided on the horizontal edges of the door to have interlocking engagement with the adjoining structure of the door opening so that strains imposed upon this structure are partly borne by the door itself.

It is evident that each of the means disclosed herein for permitting the doors to be locked in reinforcing relation to the body and frame necessitate only the conventional simple motion of the latch to release or lock the door as is common with snap-latches.

Fig. 52 illustrates one of the many possible variations of the housing arrangement which has been disclosed herein. Thus this figure shows a body of the same general type as shown in Fig. 1, (illustrated, however, with the top lowered and the side windows raised), but a housing H¹ is provided which does not extend clear to the outer edge of the vehicle. Thus the running board may have a narrow outer marginal portion which is not concealed, or, if desired, the running board need not extend to the edge of the vehicle.

A body of this type is provided with a front shell 801 protruding laterally from the housing H¹ and having a general contour similar to that of the outside of a front mud guard, the front portion of this shell merging and preferably being integral with the front part of the housing which affords a casing for the headlight.

At the rear of the vehicle a shell 802 is provided to project slightly beyond the housing H¹, this shell being in the form of a swinging and removable closure corresponding in function to the closure 50. With this form of the invention the primary hinge may be exposed, if desired, and the outer latch handle of the door may be located upon the side of the housing rather than above the same, if desired.

Fig. 53 is a diagrammatic view, somewhat sectional in character, showing the manner in which, for example, the rear shell 802 may extend outwardly beyond the housing H¹. Obviously a housing of this character may be employed to provide many of the advantages described with reference to the preferred embodiment of the invention. Thus, for example, the same general arrangement and dimensioning of parts may be employed, but the tread of the vehicle may be wider and the shells 801 and 802 may project outwardly beyond the side of the housing H¹, which itself may have the same dimensions as the housing H, or the arrangement and dimensions of the parts disposed within and concealed by the housing H¹ may be altered to permit a narrower body wall structure and a thinner door. Obviously the marginal portions of the shells 801 and 802 may be gradually curved so that their projection beyond the housing H¹ does not greatly impair the streamlining of the body.

It is of course evident that the exact shape of the housing H may be varied in numerous other ways. For example, its outer wall, instead of being vertical, may incline upwardly and inwardly, or downwardly and inwardly, or it may have a slight curvature for the major portion of its height, or it may extend to or nearer to the outer edge of the vehicle at one end of the running board than at the other. In general, however, a housing of this type preferably is characterized by a substantially continuous more or less horizontal surface extending from over the headlight in front to the rear of the door and then having a continuation inclining downwardly to the rear of the vehicle.

It is evident that a vehicle of the general character disclosed herein is particularly advantageous in affording a sturdy, streamlined construction having excellent aerodynamic stability. The arrangement of the curved windshield and inwardly inclined windows, together with the compact seating arrangement, permits the superstructure to afford low wind resistance both in the direction of vehicle movement and at angles thereto. The small size of the superstructure is particularly advantageous in aiding the stability of the vehicle when exposed to side winds.

The arrangement of the streamlined rear portion of the vehicle avoids unusually large areas behind the rear wheel which might catch the wind and tend to swing the vehicle off its course. The arrangement of the side wall of the housing with its rounded upper portion and the upwardly and inwardly inclined surface of the narrower door portion with the inwardly and upwardly inclined window cooperate in affording a surface at the side of the vehicle which, rather than tending to catch and pocket a side wind, permits its ready diversion over the vehicle.

The arrangement of the housings make it feasible to provide a single wide door and a single wide or long window panel with consequent advantages in simplicity, in good visibility, and in reduced wind resistance. The arrangement of the housing also permits accommodation of structural members, particularly in a convertible body, which may reinforce the frame so that the overall height of the vehicle may be reduced without sacrifice of inherent stiffness and consequent impairment of roadability.

It is furthermore evident that continuous relatively smooth surfaces are provided by the housing at the side of the vehicle and that the air pocket normally provided between the front and rear mud guards is entirely or substantially eliminated, with consequent reduction in air resistance, both with regard to forward movement of the vehicle in still air and with regard to side winds.

The arrangement of the curved windshield with its upper edge disposed over the front seat permits substantial wind protection for the occupants of the rear seat when the top is in its lowered or concealed position, so that there is less tendency for the wind to be directed into the passenger compartment and streamlining is enhanced, even when the top is lowered. Furthermore, the single wide window at each side of the car enhances streamlining when the windows are raised, whether the top is lowered or otherwise. The curved inwardly inclined shaping of these windows also facilitates the reduction of air resistance.

It is furthermore evident that this invention permits an unusually sturdy structure adapted to protect the occupants of the vehicle against collision and to provide an unusually generous amount of storage space, as well as affording adequate room for suitable ventilating means for both the engine and passenger compartments.

It is to be understood that the foregoing description and the accompanying disclosure are to be regarded as illustrative, and, furthermore, that the following claims are intended fully and in all respects to protect the novelty of this invention, and to that end applicant reserves the right, by reissue or otherwise, fully to protect this invention against apparent domination by claims presented by later applicants but phrased to cover structure disclosed herein.

I claim:

1. A vehicle comprising in combination housings extending along the sides of the vehicle, a door at each side of the vehicle, lateral extensions of said doors forming parts of the housings, said housings having substantially vertical planar faces, and a superstructure having upwardly and inwardly inclined front and side walls, each of said side walls comprising a single long window, downwardly and forwardly inclined posts at the junctures of said windows and said front wall, and guiding means directing the windows downwardly, forwardly and laterally to concealed positions wherein portions thereof are received in said extensions.

2. A vehicle comprising in combination front and rear mud guards, housings extending along each side of the vehicle and concealing the front and rear mud guards, a door at each side of the vehicle having a lateral extension forming a part of the corresponding housing, each of the doors having a rear extension projecting over the rear mud guard, said side walls each comprising a single long window having a part supported by said rear extension.

3. A vehicle comprising in combination housings extending along the sides of the vehicle, a door at each side of the vehicle, lateral extensions of said doors forming parts of the housings, said housings having substantially vertical planar faces, and a superstructure having upwardly and inwardly inclined front and side walls, each of said side walls comprising a single long window, downwardly and forwardly inclined posts at the junctures of said windows and said front wall, and guiding means directing the windows downwardly, forwardly and laterally to concealed positions wherein portions thereof are received in said extensions, said guiding means including a pair of straight guides inclined relative to each other to effect a turning movement of each window.

4. A vehicle comprising in combination front and rear mud guards, housings extending along each side of the vehicle and concealing the front and rear mud guards, a door at each side of the vehicle having a lateral extension forming a part of the corresponding housing, each housing having a streamlined tail portion behind the corresponding rear mud guard, a generally upwardly and forwardly inclined structural element in said tail portion, said element having its forward end over the rear mud guard, a structural member in the top of said lateral extension of the door, and a hinge connected to said element and member, said hinge being concealed within said housing.

5. A vehicle comprising in combination front and rear mud guards, housings extending along each side of the vehicle and concealing the front and rear mud guards, a door at each side of the vehicle having a lateral extension forming a part of the corresponding housing, each housing having a streamlined tail portion behind the corresponding rear mud guard, a generally upwardly and forwardly inclined structural element in said tail portion, said element having its forward end over the rear mud guard, a structural member in the top of said lateral extension of the door, a hinge connected to said element and member, said hinge being concealed within said housing, a snap-type latch at the front of the door, a structural part concealed by said housing and disposed in front of the door, and coupling means automatically movable into interfitted condition when the door is closed.

6. A vehicle body comprising a passenger compartment, front and rear seats in said compartment, a door at the side of the body affording access to both of said seats, a rear wheel housing, the lower part of said door terminating adjoining said housing, the upper part of said door having a rabbeted extension extending over said housing, a post inclining upwardly beside the front of said front seat, a long window extending from said post to a point substantially beside the rear of the rear seat, the rear portion of said window being carried by said rabbeted extension.

7. A vehicle body comprising a passenger compartment, front and rear seats in said compartment, a door at the side of the body affording access to both of said seats, a rear wheel housing, the lower part of said door terminating adjoining said housing, the upper part of said door having a rabbeted extension extending over the mid portion of the housing, a post inclining upwardly beside the front of said front seat, a long window extending from said post to a point substantially beside the rear of the rear seat, the rear portion of said window being carried by said rabbeted extension, and straight guides to direct the window downwardly and forwardly.

8. A vehicle body comprising a passenger compartment, front and rear seats in said compartment, a door at the side of the body affording access to both of said seats, a rear wheel housing, the lower part of said door terminating adjoining said housing, the upper part of said door having a rabbeted extension extending over the mid portion of the housing, a post inclining upwardly beside the front of said front seat, a long window extending from said post to a point substantially beside the rear of the rear seat, the rear portion of said window being carried by said rabbeted extension, and hinge means disposed near the outer part of the vehicle and defining an upwardly and rearwardly inclined hinge axis intersecting said wheel housing, whereby the rear of the extension may swing inwardly when the door opens without projecting a substantial distance into the passenger compartment.

9. A vehicle body comprising in combination a chassis frame, a body wall including a swinging door, and a generally truss-like structure, said structure having upwardly extending, forwardly and rearwardly inclined parts and upstanding parts connected to the frame at the front and rear of the door, and structural members in said door connecting said parts when the door is closed.

10. A vehicle body comprising in combination a chassis frame, a body wall including a swinging door, and a generally truss-like structure, said structure having upwardly extending, forwardly and rearwardly inclined parts and upstanding parts connected to the frame at the front and rear of the door, structural members in said door connecting said parts when the door is closed, and coupling means automatically movable into interfitting relation when the door is closed to connect said parts to the structural members at one end of said door.

11. In a vehicle, the combination comprising a wheel, a rear mud guard over the wheel, a housing extending behind the rear mud guard affording a compartment, and a door extending along the side of the mud guard and housing, said door being movable to afford access to the wheel and the compartment.

12. In a vehicle, the combination comprising a wheel, a rear mud guard over the wheel, a housing extending behind the rear mud guard affording a compartment, and a door extending along the side of the mud guard and housing, said door being swingable away from the compartment to afford access to the same, and when thus being swung being removable from the vehicle.

13. A vehicle comprising in combination housings extending along the side of the vehicle, a door at each side of the vehicle, lateral extensions of said doors forming parts of the housings, each door having a part extending above the lateral extension, each extension providing a ledge of substantial width, each door having a latch with an exterior handle directly above said ledge and below the upper portion of said part.

14. A vehicle comprising a rear mud guard, a door, a window mounted on the door, said door having an extension disposed over the mud guard, the rear of said window when raised being over a portion of the mud guard, the window being movable downwardly and forwardly to a position wherein the rear of the window is disposed in front of the portion of the mud guard over which it was disposed when the window was raised.

15. A vehicle comprising a rear mud guard, a door, a window mounted on the door, said door having an extension disposed over the mud guard, the rear of said window when raised being over a portion of the mud guard, the window being movable downwardly and forwardly to a position wherein the rear of the window is disposed in front of the portion of the mud guard over which it was disposed when the window was raised, an upwardly and rearwardly inclined post, the front edge of the window engaging the post during its downward movement.

16. A vehicle comprising a housing extending along the side of the vehicle, a door having a lateral extension forming a part of the housing, a rear mud guard, said door having a rear extension projecting over the mud guard, and hinge means for said door providing an axis near the front of the rear extension and intersecting said housing and disposed adjoining the outer part of said lateral extension, whereby the rear extension may swing with the door without projecting substantially into the interior of the vehicle.

17. A vehicle comprising a housing extending along the side of the vehicle, a door having a lateral extension forming a part of the housing, a rear mud guard, said door having a rear extension projecting over the mud guard, and hinge means for said door providing an axis intersecting said housing and disposed adjoining the outer part of said lateral extension, said axis being downwardly and forwardly inclined, whereby the rear extension may swing with the door without projecting substantially into the interior of the vehicle.

18. A vehicle comprising in combination housings extending along the side of the vehicle, a superstructure having walls disposed inwardly from the outer parts of the housings, said housings providing substantial shoulders beside the superstructure, and structural members disposed longitudinally in said shoulders, said vehicle having doors with lateral extensions forming parts of said housings, the structural members being disposed in said lateral extensions, and additional structural members at the front and rear of said doors and connected to said first-named members when the doors are closed.

19. A vehicle comprising in combination a chassis frame, a body wall including a swinging door, hinge means at one end of the door, a snap latch at the opposite end of the door, and at least two spaced, concealed couplings having interfitting parts at the last-named end of the door, the hinge means, the couplings and the latch cooperating to provide multi-point connecting means between the door and adjoining parts of the body wall so that the body wall provides a sturdy reinforcement for the frame, the parts of said couplings being automatically engageable and disengageable when the door is closed and opened, a structural member of hollow section extending longitudinally in the door between the hinge means and one of said couplings.

20. A vehicle comprising in combination a chassis frame, a body wall including a swinging door, hinge means at one end of the door, a snap latch at the opposite end of the door, and at least two spaced, concealed couplings having interfitting parts at the last-named end of the door, the hinge means, the couplings and the latch cooperating to provide multi-point connecting means between the door and adjoining parts of the body wall so that the body wall provides a sturdy reinforcement for the frame, the parts of said couplings being automatically engageable and disengageable when the door is closed and opened, and a rear structural member extending downwardly and rearwardly from said hinge means to the rear of the chassis frame.

21. A vehicle comprising in combination a chassis frame, a body wall including a swinging door, hinge means at one end of the door, a snap latch at the opposite end of the door, and at least two spaced, concealed couplings having interfitting parts at the last-named end of the door, the hinge means, the couplings and the latch cooperating to provide multi-point connecting means between the door and adjoining parts of the body wall so that the body wall provides a sturdy reinforcement for the frame, the parts of said couplings being automatically engageable and disengageable when the door is closed and opened, a structural member of hollow section extending longitudinally in the door between the hinge means and one of said couplings, and a rear structural member extending downwardly and rearwardly from said hinge means to the rear of the chassis frame.

22. A vehicle comprising in combination a chassis frame, a body wall including a swinging door, hinge means at one end of the door, a snap latch at the opposite end of the door, and at least two spaced, concealed couplings having interfitting parts at the last-named end of the door, the hinge means, the couplings and the latch cooperating to provide multi-point connecting means between the door and adjoining parts of the body wall so that the body wall provides a sturdy reinforcement for the frame, the parts of said couplings being automatically engageable and disengageable when the door is closed and opened, said couplings each having an elongate transversely extending male portion engageable with a corresponding female portion, one of said portions being rigidly connected to the door, the other of said portions being rigidly connected to the door jamb, said male and female portions interfitting so that they are effective in opposing movement of the door end both toward and away from the door jamb in the direction of the plane of the body wall and door.

23. A vehicle comprising in combination a chassis frame, a body wall including a swinging door, hinge means at one end of the door, a snap latch at the opposite end of the door, and at least two spaced, concealed couplings having interfitting parts at the last-named end of the door, the hinge means, the couplings and the latch cooperating to provide multi-point connecting means between the door and adjoining parts of the body wall so that the body wall provides a sturdy reinforcement for the frame, the parts of said couplings being automatically engageable and disengageable when the door is closed and opened, said couplings each having a pair of elongate transversely extending bullet-like portions and corresponding recessed portions.

24. A vehicle comprising a frame portion, a body wall including a swinging door, said door being hollow, hinge means connecting one end of the door to the adjoining body wall portion, a snap-latch at the opposite end of the door automatically actuable when the door is closed, a coupling having a part on the end of the door adjoining the latch and having a cooperating part which automatically interfits with the first part when the door is closed, said coupling being concealed in the body wall when the door is closed, an elongate structural member concealed in the door and extending between said first-named coupling part and the hinge means, said structural member having a cross-sectional shape to afford a high ratio of torsional strength to weight and when the door is closed cooperating with the coupling and hinge means to afford a substantial reinforcement for the frame portion, whereby the effective stiffness of said portion is enhanced.

25. A vehicle comprising a frame portion, a body including a housing extending along the side of the vehicle, a swinging door in the side of the body having a lateral extension forming part of said housing, said housing affording a shoulder at the upper part of said lateral extension, hinge means connecting one end of the door to the adjoining portion of the body, a snap latch at the opposite end of the door automatically actuable when the door is closed, a coupling having a part on the end of the door adjoining the latch and having a cooperating part which automatically interfits with the first part when the door is closed, an elongate structural member disposed in said shoulder and extending between said coupling and the hinged end of the door, said structural member having a cross-sectional shape to afford a high ratio of torsional strength to weight and when the door is closed cooperating with the coupling and hinge means to afford a substantial reinforcement for the frame portion, whereby the effective stiffness of said portion is enhanced.

26. A vehicle comprising in combination front and rear mud guards, housings extending along each side of the vehicle and concealing the front and rear mud guards, headlights disposed in the front portions of said housings, a single door at each side of the vehicle having a lateral extension forming part of the corresponding housing, each housing affording a storage compartment between the extension of the door and the corresponding front mud guard, a part of the housing being movable to afford access to the compartment, each housing having an upper slightly convex surface extending over the corresponding headlight and being continued in a substantially horizontal ledge in front of each lateral extension, each ledge extending along the corresponding door, the rear of the housing affording a relatively long streamlined tail portion, said ledge gradually merging into a gradually inclined and curved surface at the upper part of said tail portion, each extension having a substantially straight outer face and a width of the general order of the thickness of the part of said door above said lateral extension, the housing providing a removable panel in the plane of the outer face of said extension, said panel being located beside the rear mud guard, whereby the housing affords continuous upper and side surfaces extending for substantially the length of the vehicle without interruption by reentrant or concave surface portions.

27. A vehicle comprising front and rear seats, a door affording access to both of said seats, hinge means for said door affording an axis inclined upwardly and rearwardly beside the bottom of the rear seat but spaced outwardly at a substantial distance therefrom, said door having a rabbeted extension spaced inwardly from said axis and extending rearwardly therefrom, whereby the rear extension may swing with the door without projecting substantially into the interior of the vehicle.

28. The subject matter of the preceding claim 27, further characterized in that the inner surface of said extension is convexly curved.

29. A vehicle comprising front and rear seats, a door affording access to both of said seats, hinge means for said door affording an axis inclined upwardly and rearwardly beside the bottom of the rear seat but spaced outwardly at a substantial distance therefrom, said door having a rabbeted extension spaced inwardly from said axis and extending rearwardly therefrom, whereby the rear extension may swing with the door without projecting substantially into the interior of the vehicle, a single window carried by said door and having its rear portion supported by said extension, the window being movable downwardly and forwardly to concealed position, the path of the rear portion of the window being more steeply inclined than said axis.

30. A vehicle comprising front and rear seats, a door affording access to both of said seats, hinge means for said door affording an axis inclined upwardly and rearwardly beside the bottom of the rear seat but spaced outwardly at a substantial distance therefrom, said door having a rabbeted extension spaced inwardly from said axis and extending rearwardly therefrom, whereby the rear extension may swing with the door without projecting substantially into the interior of the vehicle, and a flexible apron connected to said extension and to the adjoining body wall, said apron providing a rearwardly projecting fold beside the back of the rear seat when the door is closed.

31. A vehicle comprising in combination a door carrying a single curved window, and guiding means directing the window downwardly and forwardly to a concealed position, the door affording a laterally curved slot through which the window moves, the guiding means being constructed to cause the window to follow a laterally curved path as it moves downwardly and forwardly through said slot, said means including forwardly inclined straight guides inclined laterally relative to each other, said means also including rollers engaging said guides and arranged to follow slightly helical paths.

32. In a vehicle having front and rear seats, the combination comprising a body wall including a long swinging door extending beside the bottom of both seats, a rear mud guard beside the rear seat, said door having a rear extension projecting over the mud guard, and hinge means supporting said door and affording an axis disposed beside but laterally outward from the forward part of said extension, a long window carried by said door and, when raised, having a portion over said extension, the window being movable downwardly and forwardly, said axis also being inclined downwardly and forwardly.

33. A vehicle according to the preceding claim 32 having the extension of the door provided with a downwardly and forwardly inclined lower wall.

34. A vehicle comprising a frame portion, a body wall including a swinging door, said door being hollow, hinge means connecting one end of the door to the adjoining body wall portion, a snap-latch at the opposite end of the door automatically actuable when the door is closed, a coupling having a part on the end of the door adjoining the latch and having a cooperating part which automatically interfits with the first part when the door is closed, said coupling being concealed in the body wall when the door is closed, an elongate structural member concealed in the door and extending between said first-named coupling part and the hinge means, said structural member having a cross-sectional shape to afford a high ratio of torsional strength to weight and, when the door is closed, cooperating with the coupling and hinge means to afford a substantial reinforcement for the frame portion, whereby the effective stiffness of said portion is enhanced, one part of said coupling providing a pair of parallel male members, the cooperating part providing recesses to receive said make members.

35. In a vehicle body, the combination comprising a body wall including a swinging door and a cooperating door jamb, a coupling having cooperating portions carried respectively by said door and jamb, one of said portions including a bullet-like male member extending transversely of the door end and a substantially horizontal rib between the sides of the member and the door to support said member, the cooperating portion having a socket to receive said member and a communicating slot through which the rib may extend.

36. In a vehicle having front and rear seats, the combination comprising a body wall including a long swinging door extending beside both seats, a rear mud guard beside the rear seat, said door having a rear portion over the mud guard, a downwardly and forwardly inclined post at the front of the door, a single lowerable window carried by the door and being movable downwardly and forwardly while contacting the post throughout its movement from raised to lowered position, and hinge means supporting the door and providing a downwardly and forwardly inclined hinge axis.

37. A vehicle comprising in combination housings extending along the side of the vehicle, a superstructure above the housings having upstanding outer walls spaced inwardly from the outer parts of the housings, said superstructure having windows extending upwardly from and spaced inwardly from said walls, said housings providing substantial shoulders at approximately the laterally outermost portions of the vehicle, said shoulders protruding outwardly below said walls, and structural members of hollow section disposed longitudinally in said shoulders.

38. A vehicle comprising in combination a side wall including a door, said door providing a window slot which is laterally curved as viewed from above so that portions thereof which are spaced from each other longitudinally of the vehicle are also laterally spaced at different distances from the longitudinal median plane of the vehicle, a laterally curved window mounted on said door and movable downwardly and forwardly through said slot, and guiding means directing the window downwardly and forwardly to a concealed position within the door, said means being constructed to cause the window to follow a laterally curved path to conform to the curvature of the slot as the window moves to concealed position, whereby the slot may be relatively narrow.

RAYMOND L. CARR.